United States Patent
Downton et al.

(10) Patent No.: US 10,920,536 B2
(45) Date of Patent: Feb. 16, 2021

(54) METHODS AND SYSTEMS FOR DESIGNING DRILLING SYSTEMS

(71) Applicant: Schlumberger Technology Corporation, Sugar Land, TX (US)

(72) Inventors: Geoffrey Downton, Cambridge (GB); Sujian J. Huang, Beijing (CN); Guishui Zheng, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 497 days.

(21) Appl. No.: 14/928,671

(22) Filed: Oct. 30, 2015

(65) Prior Publication Data

US 2016/0123118 A1 May 5, 2016

Related U.S. Application Data

(60) Provisional application No. 62/075,104, filed on Nov. 4, 2014.

(51) Int. Cl.
| | | |
|---|---|---|
| *E21B 41/00* | (2006.01) | |
| *G01V 99/00* | (2009.01) | |
| *E21B 7/00* | (2006.01) | |
| *E21B 49/00* | (2006.01) | |

(52) U.S. Cl.
CPC ............... *E21B 41/00* (2013.01); *E21B 7/00* (2013.01); *E21B 49/003* (2013.01); *G01V 99/005* (2013.01); *E21B 2200/20* (2020.05); *G01V 2200/16* (2013.01); *G01V 2210/66* (2013.01)

(58) Field of Classification Search
CPC ............. G01V 99/005; G01V 2210/66; G01V 2200/16; G06F 17/5009; G06F 3/20; E21B 7/00; E21B 41/0092; E21B 41/00; E21B 49/003; E21B 2200/20
USPC ........................................................ 703/7, 10
See application file for complete search history.

(56) References Cited

U.S. PATENT DOCUMENTS

| | | | |
|---|---|---|---|
| 6,349,595 | B1 | 2/2002 | Civolani et al. |
| 6,516,293 | B1 | 2/2003 | Huang et al. |
| 6,785,641 | B1 | 8/2004 | Huang |
| 6,873,947 | B1 | 3/2005 | Huang et al. |
| 7,020,597 | B2 | 3/2006 | Oliver et al. |
| 7,139,689 | B2 | 11/2006 | Huang |
| 7,464,013 | B2 | 12/2008 | Huang et al. |

(Continued)

FOREIGN PATENT DOCUMENTS

WO 2013032863 A1 3/2013

OTHER PUBLICATIONS

International Search Report issued in related PCT application PCT/US2015/058616 dated Feb. 26, 2016, 3 pages.

*Primary Examiner* — Kamini S Shah
*Assistant Examiner* — John E Johansen
(74) *Attorney, Agent, or Firm* — Alec J. McGinn

(57) ABSTRACT

A method for designing a physical component of a drilling system includes defining input parameters of a first primitive in the drilling system, simulating the first primitive to obtain a performance parameter of the first primitive, designing, based on the performance parameter and to obtain a design, the physical component for the drilling system, and storing the design. The physical component has the input parameters of the first primitive. The input parameters include at least one control relationship between a first control point on the first primitive and a second control point.

18 Claims, 34 Drawing Sheets

(56) References Cited

U.S. PATENT DOCUMENTS

| | | | |
|---|---|---|---|
| 7,693,695 B2 | 4/2010 | Huang et al. | |
| 7,844,426 B2 | 11/2010 | Huang | |
| 7,953,586 B2 * | 5/2011 | Chen | E21B 7/00 175/45 |
| 8,214,188 B2 * | 7/2012 | Bailey | E21B 7/00 703/10 |
| 8,285,531 B2 * | 10/2012 | Moran | E21B 7/00 703/10 |
| 8,401,831 B2 | 3/2013 | Tang et al. | |
| 2004/0143427 A1 | 7/2004 | Huang et al. | |
| 2005/0096847 A1 * | 5/2005 | Huang | E21B 10/16 702/9 |
| 2005/0149306 A1 | 7/2005 | King | |
| 2007/0067147 A1 * | 3/2007 | Huang | E21B 10/00 703/7 |
| 2007/0093996 A1 * | 4/2007 | Cariveau | E21B 10/55 703/7 |
| 2012/0219933 A1 | 8/2012 | Chen | |
| 2013/0124165 A1 * | 5/2013 | Rubin | G06F 17/10 703/2 |
| 2014/0309978 A1 | 10/2014 | Chen et al. | |
| 2016/0110481 A1 * | 4/2016 | Jain | E21B 7/00 703/2 |

\* cited by examiner

FIG. 9C

Fyz Model Select

☑ Is Input By Parameters

Spring Rate(lbf/in) 10000
● Linear-Damping(lbf*s/in) 120
○ Nonlinear-Damping(lbf*s2/in2) 0.000
○ Rayleigh-Damping
Preload Force(lbf) 0.000

Max Uyz(in) 0.000
Min Uyz(in) 1

☑ Is Neutral
Neutral Center(in) 0.000
Neutral Width(in) 0.000

OK    Cancel

FIG. 10D

Lateral Relation Model Select — 715

Model: Free Contact

Contact Parameter
Friction Coefficient 0.000000 — 717
Spring Stiffness(lbf.inch) 1.200000e+07 — 719

Parameter for Lateral Model
☐ Input Gap(inch) 0.000000 — 721
                               — 723

OK    Cancel

FIG. 10C

Tool Face Apply Position Sele ☒

| Model | Well ▽ |

┌─ Well contact Min. Max. Displacement ─┐

*811* — Min Disp.(inch) | 4.070

*813* — Max Disp.(inch) | 4.470

[ OK ]   [ Cancel ]

---

Tool Face Apply Position Select ☒

| Model | Housing ▽ |

┌─ Contact Parameter ─┐

*815* — ☐ Is Contact With Flat Plate

*817* — Friction Coefficient | 0.200

*819* — Contact Stiffness(lbf.inch) | 1.200000e+06

┌─ Parameters for Housing Model ─┐

*821* — ☐ Input Housing ID(inch) | 0.000 — *823*

[ OK ]   [ Cancel ]

Axial Transformer Component Parameter

| General | Axial Relation | B1-B2 Lateral Relation | B1/B2 B3 Lateral Relation | Tool Face | External Control |

External Control
- ☐ Is External Control
- ☐ Control WOB — 913 Control RPM

External Control Parameter

| Control Cycle(second) | 60.000 | Time to Start Control(second) | 100.000 |
| Statistics Time(seconds) | 2.000 | Interval Number | 600 |
| Control Input File | ControlPackageInputs | Control Output File | ControlPackageOutputs | 917

External Control Output Point

| | Point |
|---|---|
| 1 | B1 Point1 |
| 2 | B2 Point2 |
| 3 | B3 Point3 |
| 4 | B2 Point1 |

Add    Delete

OK    Cancel 911
915

B1:P1  B1:P2  B1:P3  B3:P1  B3:P2  B3:P3  B2:P1  B2:P2  B2:P3

METHODS AND SYSTEMS FOR DESIGNING DRILLING SYSTEMS

CROSS-REFERENCE TO RELATED APPLICATIONS

Pursuant to 35 U.S.C. §119(e), this application claims the benefit of U.S. Provisional Application No. 62/075,104, filed Nov. 4, 2014, the entire disclosure of which is incorporated herein by reference.

BACKGROUND

Operations, such as geophysical surveying, drilling, logging, well completion, hydraulic fracturing, steam injection, and production, among others, are performed to locate and gather valuable subterranean assets, such as valuable fluids or minerals. The subterranean assets may not be limited to hydrocarbons such as oil or gas. For example, objects lost in a well may be recovered, an operation known as fishing. After gathering subterranean assets, operations such as well abandonment may involve the sealing of a well to safely and economically decommission a well.

Throughout this document, the terms "oilfield" and "oilfield operation" may be used interchangeably with the terms "field" and "field operation" to refer to a site where any types of valuable fluids or minerals can be found and the activities to extract them. The terms may also refer to sites where substances are deposited or stored by injecting them into subterranean structures using boreholes and the operations associated with this process. Further, the term "field operation" refers to a field operation associated with a field, including activities related to field planning, wellbore drilling, wellbore completion, production using the wellbore (also referred to as borehole), and abandonment of a well after production has completed (well sealing).

SUMMARY

Embodiments of the present disclosure relate generally to methods for designing drilling systems and/or physical drilling components thereof that include modeling and simulating a primitive of one or more drilling components. A primitive of a drilling component may be defined by at least one control relationship between a first control point on the primitive and a second control point either on or off the primitive. The primitive may be modeled and simulated in simulated drilling operation environments to determine one or more performance parameters. Based on the performance of the primitive, a physical drilling component and/or drilling system may be designed based on the input parameters of the simulated drilling component and/or drilling system. Embodiments of the present disclosure may also relate generally to systems for designing a drilling component of a drilling system based on one or more primitive simulations that includes a computer processor and memory having instructions executing on the computer processor with functionality to perform the simulations.

BRIEF DESCRIPTION OF DRAWINGS

FIGS. 9A-9F depict relationships of a primitive in accordance with one or more embodiments of the present disclosure.

FIGS. 10A-10F depict relationships of a primitive in accordance with one or more embodiments of the present disclosure.

FIGS. 11A-11D depict tool face control points in accordance with one or more embodiments of the present disclosure.

FIGS. 14A-14B depict examples of designing a primitive in accordance with one or more embodiments of the present disclosure.

DETAILED DESCRIPTION

Figure 1:
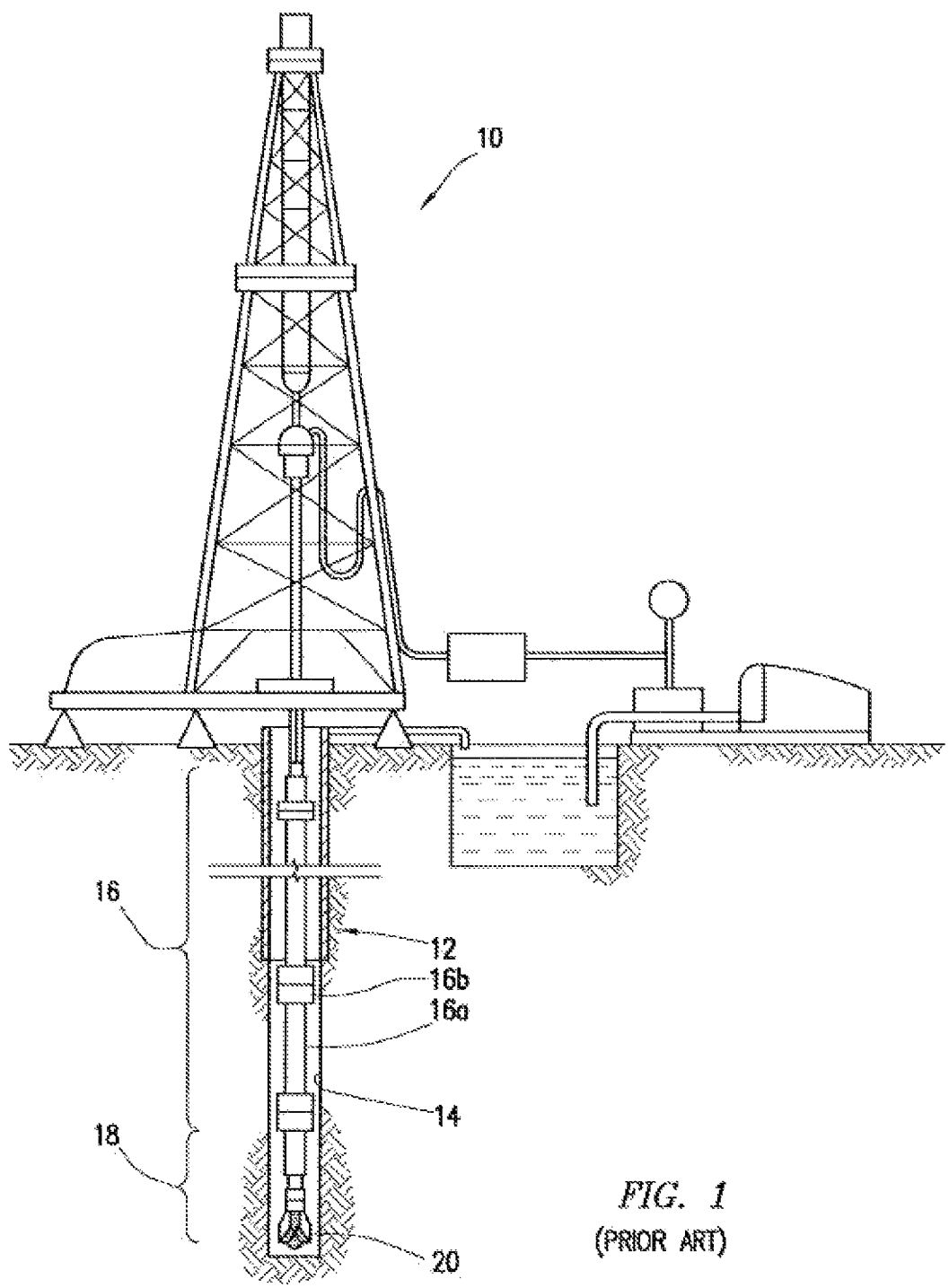
FIG. 1 shows a conventional drilling system for drilling an earth formation.

Specific embodiments of the invention will now be described in detail with reference to the accompanying figures. Like elements in the various figures are denoted by like reference numerals for consistency. The drawings are not necessarily to scale and certain features may be shown exaggerated in scale or in schematic in the interest of clarity and conciseness.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the terms "up" and "down"; "upper" and "lower"; "upwardly" and "downwardly"; "below" and "above"; "top" and "bottom"; and other similar terms indicating relative positions above or below a given point or element may be used in connection with some implementations of various technologies described herein. However, when applied to equipment and methods for use in wells or boreholes that are deviated or horizontal, or when applied to equipment and methods that when arranged in a well or borehole are in a deviated or horizontal orientation, such terms may refer to a left to right, right to left, or other relationships as appropriate.

FIG. 1 shows one example of a conventional drilling system for drilling an earth formation. The drilling system includes a drilling rig 10 used to turn a drilling tool assembly 12 that extends downward into a wellbore 14. The drilling tool assembly 12 includes a drill string 16, and a bottomhole assembly (BHA) 18, which is attached to the distal end of the drill string 16. The "distal end" of the drill string is the end furthest from the drilling rig.

The drill string 16 includes several joints of drill pipe 16a connected end to end through tool joints 16b. The drill string 16 is used to transmit drilling fluid (through the hollow core of the drill string) and to transmit rotational and axial power from the drill rig 10 to the BHA 18. In some cases the drill string 16 further includes additional components such as subs, pup joints, etc.

The BHA 18 includes at least a bit 20. BHAs may also include additional components attached between the drill string 16 and the bit 20. Examples of additional BHA components include drill collars, stabilizers ("stabs"), measurement-while-drilling (MWD) tools, logging-while-drilling (LWD) tools, subs, hole enlargement devices (e.g., hole openers and reamers), jars, accelerators, thrusters, downhole motors, impacting tools (e.g., percussion tools and hammers), and rotary steerable systems.

When drilling, rotational moment and axial force is applied to the bit 20 to cause the cutting elements of the bit 20 to cut into material and/or crush formation as the bit 20 is rotated. In percussion drilling, the cutting may be caused by an impact force. The impact force may be directed along a direction of travel of the drill string. The axial force applied on the bit 20 is referred to as the "weight on bit" (WOB) and impact force may generate additional WOB. The rotational moment applied to the drilling tool assembly 12 at the drill rig 10 (e.g., by a rotary table or a top drive mechanism) to turn the drilling tool assembly 12 is referred to as the "rotary torque." Additionally, the speed at which the rotary table rotates the drilling tool assembly 12, measured in revolutions per minute (RPM), is referred to as the "rotary speed."

Drilling refers to using a drill bit (e.g., bit 20, FIG. 1) to remove earth formation at a distal end of a borehole. While FIG. 1 shows an example of an on-shore drilling system, drilling may also be conducted using an off-shore drilling system. Generally, off-shore drilling systems may include risers extending from an off-shore platform to a borehole, where a drill string may extend through the risers and to the borehole to drill the earth formation.

Figure 2:
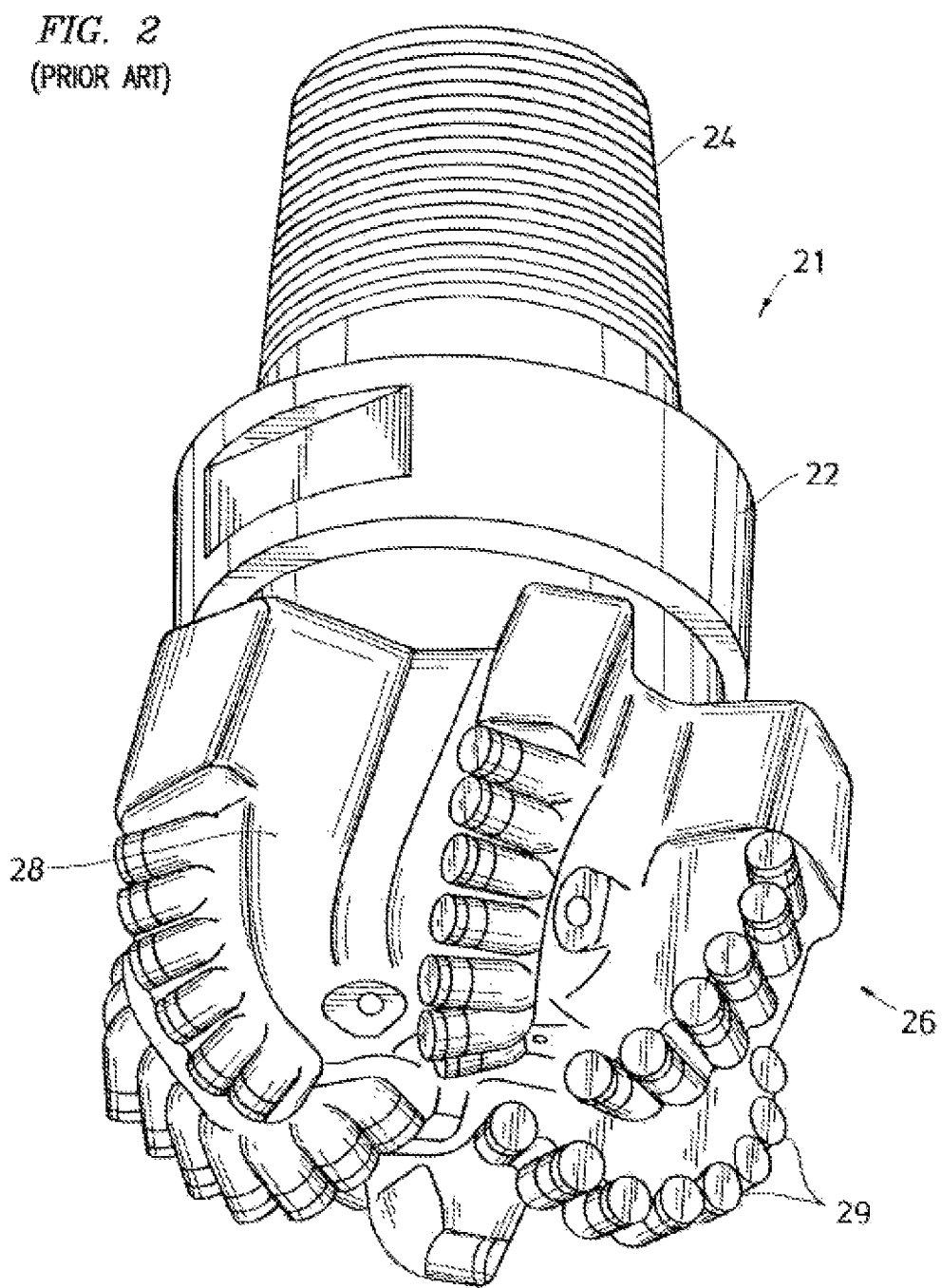
FIG. 2 shows a conventional fixed-cutter bit.

Referring to FIG. 2, an example of a drill bit known as a fixed-cutter bit is shown. Fixed-cutter bit 21 has a bit body 22 having a threaded connection at one end 24 and a cutting head 26 formed at the other end. The head 26 of the fixed-cutter bit 21 includes multiple ribs or blades 28 arranged about the rotational axis of the drill bit and extending radially outward from the bit body 22. Cutting elements 29 are embedded in the raised ribs 28 to cut formation as the drill bit is rotated on a bottom surface of a well bore. Cutting elements 29 of fixed-cutter bits include polycrystalline diamond compacts (PDC) or specially manufactured diamond cutters. These drill bits are also referred to as PDC bits or drag bits.

Design and manufacture of drilling and operating equipment may be expensive. In order to optimize performance of a drilling system, engineers may consider a variety of factors. For example, when designing a drilling system, engineers may consider a rock profile (e.g., the type of rock or the geologic characteristics of an earth formation), different forces acting on the drilling system, drilling performance parameters, drill bit parameters, and/or well bore parameters, among many others.

According to embodiments of the present disclosure, modeling of a drilling system may be completed and tested before the drilling system is manufactured and in actual use. Such embodiments may be useful, for example, when engineers do not have access to the resources (time, money, etc.) for testing an assembled or manufactured design of a drilling system and/or to perform adequate testing and experimentation to fully develop a drilling component. Further, there may be a limited number of scenarios in which a concept may be useful and thus, it may not be worth the time and effort to manufacture multiple proofs of concept in order to achieve a desired performance. If the engineer has the opportunity to perform proper testing and experimentation of a concept, such as a new design of a drilling component or a new arrangement of drilling components, and, after extensive testing, the concept underperforms or is dysfunctional, for example, valuable resources would have been used on a failed concept.

Successful drilling operations may depend on appropriate selection of drilling tools, types of drilling fluids, and drilling techniques. In addition, drill bits, or other cutting tools, should be appropriate for the borehole conditions and the materials to be removed, the fluids should be capable of removing drilled material from the wellbore, and the techniques employed should be appropriate for the anticipated conditions in order to achieve operation objectives.

Therefore, in order to more efficiently develop and test concepts for drilling systems and components, engineers may use modeling and/or simulations to determine "system" performance related information when deciding whether a particular concept is worth pursuing. In addition, comparing drilling components, component parameters, and how the drilling components operate under certain conditions may be helpful in designing and developing drilling components that may otherwise been unrealistic to design and develop.

Accordingly, embodiments disclosed herein provide methods and techniques to design, model, and/or simulate the behavior of a drilling system and/or one or more drilling components under many different conditions. More particularly, one or more embodiments disclosed herein provide for methods of directly comparing drilling systems and/or drilling components (against selected criteria or against each other) to determine whether a particular concept is designable, performs adequately, and/or worth manufacturing for use in a field operation.

Unlike previously used methods of simulating drilling systems or operations that include fully designing and modeling the drilling system or operation for simulation, embodiments of the present disclosure may include providing one or more primitives of drilling components in a drilling system for simulation. For example, according to embodiments of the present disclosure, simulation of a primitive or generic base form of one or more drilling components may provide a system level view conceptualization of how such drilling component types or drilling component arrangement may perform in the drilling system. The primitives of the drilling components may then be more particularly designed and/or modeled for use in the drilling system.

As used herein, the term "primitive" may be used to refer to a general shape that is defined by control relationships (discussed below) between elements of the general shape and/or points along the general shape of the primitive. As an example for conceptualizing a "primitive," a primitive may have a series of performance criteria defined by control relationships between elements or selected points of the primitive. In some embodiments, a primitive may have a general form of a drilling component for a drilling system, where the primitive may be defined by control relationships between elements or points on the primitive and may have other aspects of the component design undefined. For example, a primitive may be defined by a number of control relationships rather than particular design specifications (e.g., material selection, particular dimensions of one or more elements, number of cutting elements, etc.) In some embodiments, defining one or more control relationships may or may not result in a design specification being defined. For example, defining one or more control relationships, such as circumferential properties along a circumference or perimeter of a primitive body or a contact relationship (discussed more below), may result in a surface area design specification being defined for one or more elements in the primitive. In some embodiments, a primitive may have one, two, three, or more design specifications undefined.

"Control relationships" may include static and/or dynamic relationships and may define the degrees of freedom and relative movement within the degrees of freedom between the elements and/or points of the general shape of the primitive. When defining a control relationship, a number of different relationship types may be considered. For example, control relationships may include but are not limited to axial relationships (i.e., relationships along a primitive longitudinal axis), lateral relationships (i.e., relationships along an axis perpendicular to the longitudinal axis), radial relationships (i.e., relationships defined with respect to a radial dimension from the longitudinal axis) and circumferential properties along a circumference or perimeter of a primitive body, stroke relationship (e.g., one of a contact relationship (tension and/or compression), an impact relationship (if a compress relationship is determined), and an overlap relationship), and a type or source of energy for actuation such as electromagnetic energy, pressurized fluid energy, or hydraulic energy, to name a few. Other relationship types may be used for inputting parameters of one or more primitives, depending on, for example, the component type or portion of the drilling system being modeled with a primitive. Various control relationship types are discussed herein with reference to different examples of primitives.

According to some embodiments of the present disclosure, a primitive may be defined by control relationships that include one or more performance parameters and/or properties. For example, a primitive may be defined as having at least one of a defined mass, stiffness, Young's modulus, density and volume distribution. If the selected properties of the primitive are desired, the primitive may be used to specify the parameters of a drilling component. In other words, a drilling component may be designed to have selected properties based on desired performance of a primitive of the drilling component having the selected properties. For example, material of the drilling component may be selected to provide one or more of the selected properties defined by control relationships of the primitive. If no known material is capable of providing the selected properties, the control relationships may be altered to require one or more different properties. In some embodiments, a range of performance parameters and/or properties may be defined by the control relationships of a primitive.

Control relationships of a primitive may be defined between selected points (referred to herein as "control points") along the primitive and/or between selected elements of the primitive. As used herein, "elements" of a primitive may refer to bodies, segments or subcomponents of a primitive, where each element has a shape that together form the general shape of the primitive. For example, a primitive may have a general shape of a slender body having a first end and a second end, where a control relationship may be defined between a selected control point at each of the first and second ends. The control relationship defined between the selected control points at the first and second ends may include the number of degrees of freedom between the selected control points and the relative movement within each degree of freedom. In another example, a primitive may have a general shape that includes two or more elements, where control relationships may be defined between each of elements.

Control relationships may also be defined between two different primitives or between a primitive and a drilling component or element of a drilling system. For example, control relationships may be defined between a selected control point or element of a first primitive and a selected control point or element of a second primitive. As another example, control relationships may be defined between a selected control point or element of a first primitive and a pre-designed drilling component in the drilling system.

In one or more embodiments, a drilling system includes multiple drilling components. Drilling components may include a component of a drilling rig, a component of a drillstring, a component of a BHA, or may be a component of any other type known in the art. A drilling component may include a number of individual elements that make up the drilling component as a whole (e.g., where the elements may be assembled together to form the drilling component as a whole, or where the elements may be integrally formed together to form the drilling component as a whole). When designing a drilling system and/or one or more drilling components of a drilling system, it may be beneficial to design individual elements of the drilling component and thereafter define the control relationships between each of the individual elements.

According to embodiments of the present disclosure, a drilling design tool may be used to define control relationships for one or more primitives and simulate the one or more primitives, either individually or performing in a drilling system.

Figure 3:
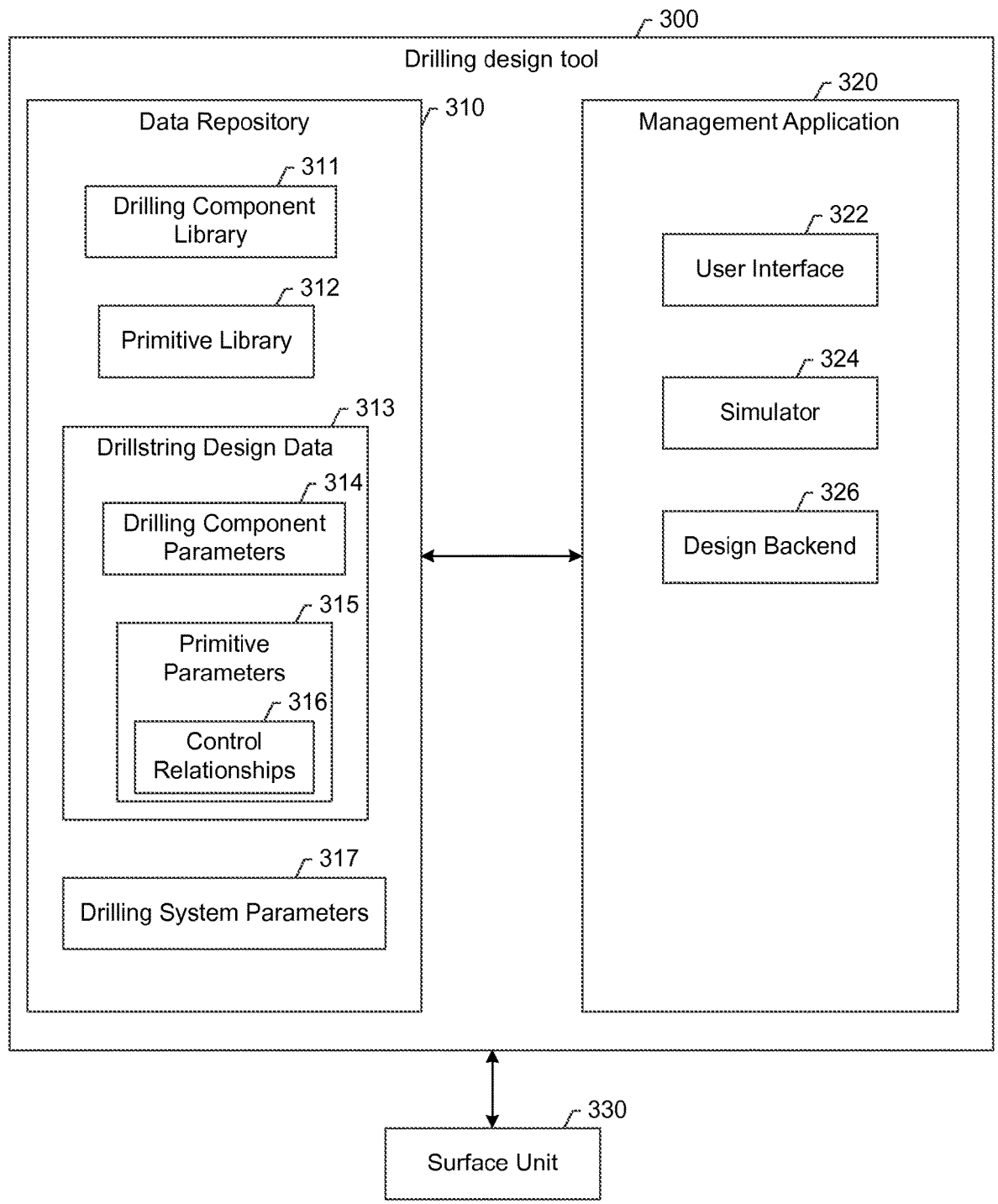
FIG. 3 shows a drilling design tool in accordance with one or more embodiments of the present disclosure.

For example, referring to FIG. 3, a drilling design tool 300 may include a data repository 310 and a management application 320. The data repository 310 is any type of storage unit and/or device (e.g., a file system, database, collection of tables, or any other storage mechanism) for storing data. Further, the data repository 310 may include multiple different storage units and/or devices. The multiple different storage units and/or devices may or may not be of the same type or located at the same physical site.

The data repository 310 may include a drilling component library 311, a primitive library 312, drillstring design data 313, and drilling system parameters 317. The drilling component library 311 may include data relating to stored pre-designed drilling components. For example, pre-designed drilling components may include drilling components that have been previously used in drilling operations, previously designed but unused drilling components, and drilling components currently being used in drilling operations. Data relating to pre-designed drilling components may include, for example, design parameters, such as shapes, sizes, and material properties, and performance parameters, such as stress experienced under certain conditions. The primitive library 312 may include stored primitives that have been defined by a certain number of control relationships. The drillstring design data 313 may include drilling component parameters 314 and primitive parameters 315, where primitive parameters may be defined by one or more control relationships 316. Drilling component parameters may include, for example, BHA parameters, design parameters of a drill string, and parameters of other drilling components, such as size, shape, material properties, etc. of a drilling component. Drilling system parameters 317 may include well bore parameters, drilling operating parameters, and other parameters of the drilling system, such as discussed herein.

"Well bore parameters" may include one or more of the following: the geometry of a well bore and formation material properties (i.e. geologic characteristics). The trajectory of a well bore in which the drilling tool assembly is to be confined also is defined along with an initial well bore bottom surface geometry. Because the well bore trajectory may be straight, curved, or a combination of straight and curved sections, well bore trajectories, in general, may be defined by defining parameters for each segment of the trajectory. For example, a well bore may be defined as including N segments characterized by the length, diameter, inclination angle, and azimuth direction of each segment and an indication of the order of the segments (i.e., first, second, etc.).

Well bore parameters defined in this manner can then be used to mathematically produce a model of the entire well bore trajectory. Formation material properties at various depths along the well bore may also be defined and used. One of ordinary skill in the art will appreciate that well bore parameters may include additional properties, such as friction of the walls of the well bore, casing and cement properties, and well bore fluid properties, among others, without departing from the scope of the disclosure.

"BHA parameters" may include one or more of the following: the type, location, and number of drilling components included in the drilling tool assembly; the length, internal diameter, outer diameter, including any deviations from a circular pipe shape such as pads or recesses, or any other shape input, weight, and material properties of each drilling component or subcomponents of the drilling components; the type, size, weight, configuration, and material properties of the drilling tool; and the type, size, number, location, orientation, and material properties of the cutting elements on the drilling tool. Material properties in designing a drilling tool assembly may include, for example, the strength, elasticity, and density of the material. It should be understood that drilling tool assembly design parameters may include any other configuration or material property of the drilling tool assembly without departing from the scope of the disclosure.

"Bit parameters," which are a subset of BHA parameters, may include one or more of the following: bit type, size of bit, shape of bit, cutting structures on the bit, such as cutting type, cutting element geometry, number of cutting structures, and location of cutting structures. As with other drilling components in the drilling tool assembly, the material properties of the bit may be defined.

"Drilling operating parameters" may include one or more of the following: the rotary table (or top drive mechanism), speed at which the drilling tool assembly is rotated (RPM), the downhole motor speed (if a downhole motor is included) and the hook load. Drilling operating parameters may further include drilling fluid parameters, such as the viscosity and density of the drilling fluid and pump pressure, for example. It should be understood that drilling operating parameters are not limited to these variables. In other embodiments, drilling operating parameters may include other variables, e.g., rotary torque and drilling fluid flow rate. Dip angle is the magnitude of the inclination of the formation from horizontal. Strike angle is the azimuth of the intersection of a plane with a horizontal surface. Additionally, drilling operating parameters for the purpose of drilling simulation may further include the total number of drill bit revolutions to be simulated, the total distance to be drilled, or the total drilling time desired for drilling simulation.

Referring again to FIG. 3, the management application 320 is hardware, software, firmware, or any combination thereof that includes functionality to manage the oilfield operations. The management application 320 may take selected data from the data repository to simulate one or more primitives, either individually or performing in a drilling system. As shown, the management application 320 may include a user interface 322, a design backend 326 and a simulator 324. Input parameters selected from the data repository may be submitted through the user interface 322. The design backend 326 may process the submitted parameters, which are provided to the simulator 324 for simulation. As discussed herein, one or more primitives may be simulated individually, or one or more primitives may be simulated performing in a drilling system.

As used herein, a "drilling simulation" is a dynamic simulation of a drilling system, a drilling component and/or a primitive of a drilling component used in a drilling operation. The drilling simulation is referred to as being "dynamic" because the drilling simulation is a "transient time simulation," meaning that the drilling simulation is based on time or the incremental rotation of the drilling tool assembly. Methods for such simulations are known to the assignee of the current application, such as those disclosed in U.S. Pat. Nos. 6,516,293, 6,873,947, 7,844,426, 7,139,689, 6,785,641, 8,401,831, and 7,464,013 as well as U.S. patent application Ser. Nos. 10/749,019, 10/852,574, 10/851,677, 10/888,358, and 10/888,446, each of which is incorporated by reference in its entirety.

By simulating the primitive or the drilling system with the primitive, rather than an entire design of a physical drilling component, the performance of the computing device is increased in one or more embodiments. In other words, the simulations may be performed faster through the use of the primitive. Thus, a user or application requesting the simulation in order to answer drilling system design questions may obtain a quicker result and analysis than if the entire physical component were simulated. Further, a primitive may use less time to design than designing the physical component. Thus, failure of the physical component to achieve a performance metric, based on the component's corresponding primitive, may be determined faster.

Computer-aided design software, such as Integrated Design and Engineering Analysis Software (I-DEAS®), may be used for conducting a drilling simulation of a primitive or a primitive in a drilling system. For example, according to embodiments of the present disclosure, input parameters of at least one primitive may be defined, where the input parameters may include at least one control relationship for each of the at least one primitive, such as described above. The input parameters may be submitted via a user interface of a computer-aided design software program. The computer-aided design software may also include a design backend, which processes the input parameters for the drilling simulation to be performed. The primitive(s) may then be simulated in the drilling simulation using the computer-aided design software program. From the simulation, one or more performance parameters of the primitive(s) may be determined from the simulation.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure. Further, portions of the systems and methods may be implemented as software, hardware, firmware, or combinations thereof.

In the embodiments shown in FIG. 3, the drilling design tool 300 may be in communication with a surface unit 330. A surface unit may include control units for one or more equipment units on a drilling platform or rig. In some embodiments, a surface unit may include a surface unit data management system, such as a surface unit computing system, that is in communication with one or more sensors and/or equipment units in a drilling system. For example, a drilling system may include sensors, where measurements taken by the sensors may be processed and collected by a computer processor in a surface unit data management system. The surface unit data management system may be in communication (wired or wireless communication) with a drilling design tool in accordance with embodiments of the present disclosure. The surface unit data management system may send data related to the drilling system to the drilling design tool and/or the drilling design tool may send data and/or commands to the surface unit data management system (e.g., instructions to control performance of one or more equipment units in the drilling system, such as turning on or off a valve, increasing or decreasing drill string rotation, or altering downhole fluid flow). In other embodiments, a drilling design tool is not in communication with a surface unit.

Drilling design tools may be a computing system that includes a computing device having a graphical user interface executing on a computer processor with functionality to perform modeling and/or simulating one or more primitives of the drilling system. For example, the computer processor may have parameters of the drilling system submitted, including but not limited to primitive parameters, BHA parameters, wellbore parameters, and drilling operating parameters. The computer processor may also have defined at least one control relationship between selected control points and/or elements of at least one primitive. The computer processor may perform a first simulation of the primitive(s) based on the submitted parameters and present, on the graphical user interface, one or more first performance parameters from the first simulation.

Figure 4:
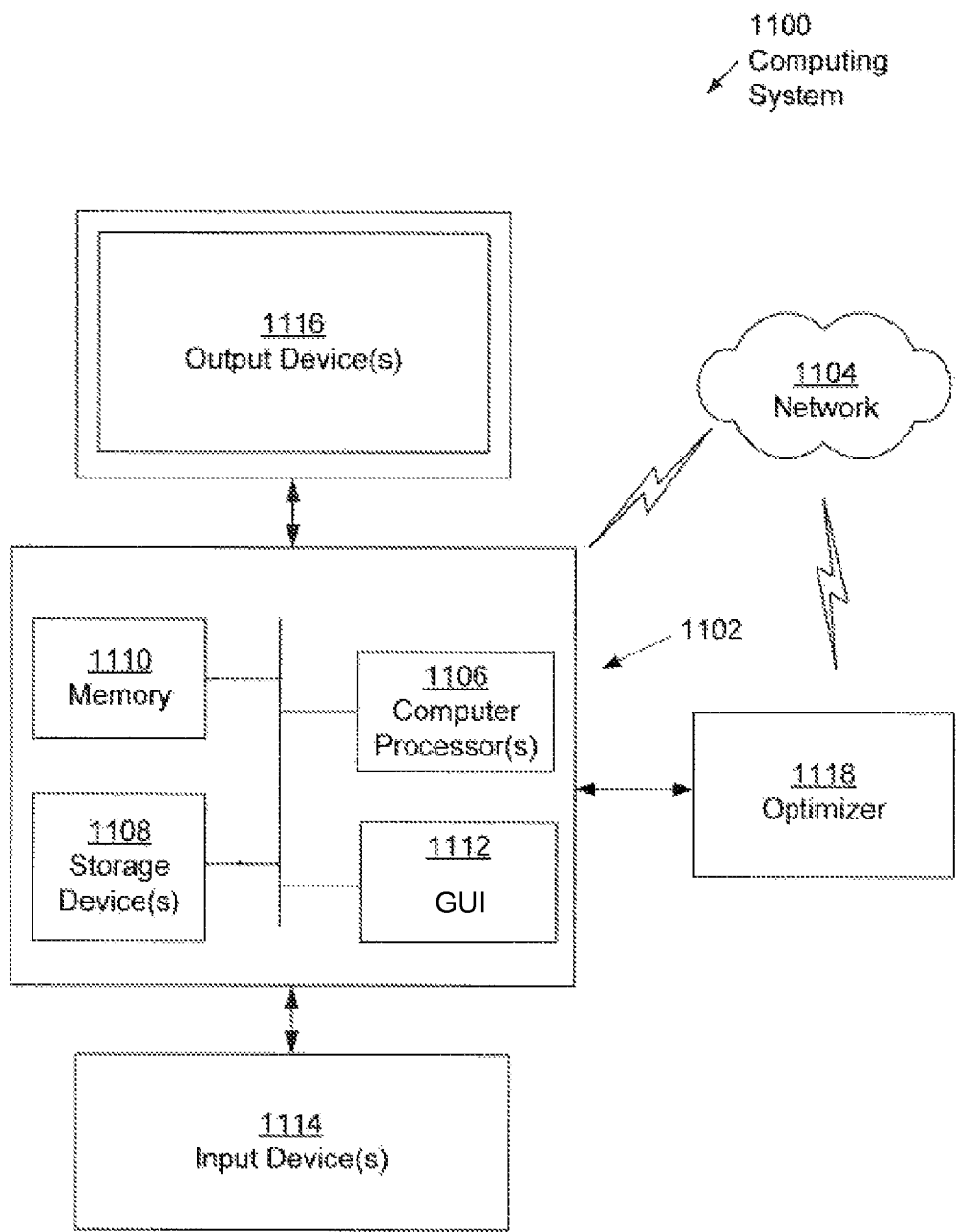
FIG. 4 depicts a system with which one or more embodiments of the present disclosure may be implemented.

FIG. 4 depicts a computing system with which one or more embodiments of the present disclosure may be implemented. In one or more embodiments, one or more of the modules and elements shown in FIG. 4 may be omitted, repeated, and/or substituted. Accordingly, embodiments of the present disclosure should not be considered limited to the specific arrangements of modules shown in FIG. 4.

As shown in FIG. 4, a computing system 1100 includes a computing device 1102 having one or more computing processors 1106, one or more storage devices 1108 (e.g., a hard disk, an optical drive such as a compact disk (CD) drive or digital versatile disk (DVD) drive, a flash memory stick, etc.), memory 1110 (e.g., random access memory (RAM), cache memory, flash memory, etc.), and a graphical user interface (GUI) 1112. The computing processor(s) 1106 may be an integrated circuit for processing instructions. For example, the computing processor(s) may be one or more cores, or micro-cores of a processor. The storage device(s) 1108 (and/or any information stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The storage device(s) 1108 may be a device internal to the computing device 1102, or the storage device(s) 1108 may be an external storage device operatively connected to the computing device 1102. According to some embodiments, the storage device(s) 1108 may include a data repository having stored parameters from real/physical drilling systems and/or real/physical drilling components, stored primitive parameters, and/or stored parameters from previously performed simulations, where at least one of the stored parameters may be submitted parameters for simulation of a drilling system. Additionally, the computing device 1102 may include numerous other elements and functionalities.

The computing device 1102 may be communicatively coupled to a network 1104 (e.g., a local area network (LAN), a wide area network (WAN) such as the Internet, mobile network, or any other type of network) through wires, cables, fibers, optical connectors, a wireless connection, or a network interface connection (not shown).

The computing system 1100 may also include one or more input device(s) 1114, such as a touchscreen, keyboard, mouse, microphone, touchpad, electronic pen, or any other type of input device. Further, the computing system 1100 may include one or more output device(s) 1116, such as a screen (e.g., a liquid crystal display (LCD), a plasma display, touchscreen, cathode ray tube (CRT) monitor, projector, 2D display, 3D display, or other display device), a printer, external storage, or any other output device. One or more of the output device(s) 1116 may be the same or different from the input device(s). The input and output device(s) may be locally or remotely (e.g., via the network 1104) connected to the computer processor(s) (1106), memory (1110), storage device(s) (1108), and GUI 1112. Many different types of computing systems exist, and the aforementioned input and output device(s) may take other forms.

Further, one or more elements of the computing system 1100 may be located at a remote location and connected to the other elements over a network 1104. Further, embodiments of the disclosure may be implemented on a distributed system having nodes, where each portion of the disclosure may be located on a different node within the distributed system. In one embodiment of the disclosure, the node corresponds to a distinct computing device. In another embodiment, the node may correspond to a computer processor with associated physical memory. In another embodiment, the node may correspond to a computer processor or micro-core of a computer processor with shared memory and/or resources.

The GUI 1112 may be operated by a user (e.g., an engineer, a designer, an operator, an employee, or any other party) using one or more input devices 1114 and the GUI 1112 may be visualized one or more output devices 1116 coupled to the computing device 1102. The GUI may include one or more buttons (e.g., radio buttons), data fields (e.g., input fields), banners, menus (e.g., user input menus), boxes (e.g., input or output text boxes), tables (e.g., data summary tables), sections (e.g., informational sections or sections capable of minimizing/maximizing), screens (e.g., welcome screen or home screen), and/or user selection menus (e.g., drop down menus). In addition, the GUI may include one or more separate interfaces and may be usable in a web browser or as a standalone application.

Although the output device(s) 1116 is shown as being communicatively coupled to the computing device 1102, the output device(s) 1116 may also be a component of the computing device 1102.

In FIG. 4, the computing device 1102 may have a management application capable of designing and simulating a drilling system and/or a primitive of a drilling system. The primitive to be designed and/or simulated may be customized, by a user. The user may select from a pre-existing library of primitives, sub-primitives, segments, and sub-segments (not shown) or may manually input parameters for any primitive based on a design concept, for example. In one or more embodiments, the user may input or define primitive parameters to model a primitive of a drilling system. The primitive parameters may include parameters for one or more primitive elements and control relationship(s) defined between the primitive element(s). In addition, a number of control points as well as a control relationship between one or more control points may be defined to model the primitive. A drilling component may then be modeled based on the designed primitive.

In addition, a number of other drilling components or primitives may be included in the primitive model, and the user may also customize a number of parameters associated with each of the other drilling components or primitives. For example, the user may modify the length and position of a primitive with respect to a drill bit. Additionally, to simulate the primitive of the drilling system, the simulation may be customized by inputting or selecting a variety of well bore parameters and drilling operating parameters. To modify the primitive, customize the drilling system, customize a primitive of the drilling system, and/or customize other simulation parameters, the user may access storage devices(s) 1108 using any input means known in the art (e.g., input device(s) 1114). The storage device(s) 1108 is capable of having data stored thereon and may include, for example, rock profiles, BHA parameters and primitive parameters, drilling component parameters, and/or drilling operating parameters, among many others. Once the user customizes the primitive and other simulation parameters, the computing device 1102 may execute instructions on the computing processor(s) 1106, for example, using a computer-aided design software such as I-DEAS, to perform a simulation of the primitive, using corresponding primitive parameters and any additional parameters selected or input by the user, such as BHA parameters, wellbore parameters, and drilling operating parameters, among many others.

In addition, a drilling system or a primitive of the drilling system may be selected for simulation or modified based on data input or selected by the user. The user may also modify the drilling system or the primitive based on particular drilling operating parameters, wellbore parameters, or any other conditions known in the art or disclosed herein. For example, a user may determine a desired WOB or ROP and may modify the drilling system or the primitive accordingly taking into account the desired WOB and/or ROP, among others using the GUI.

Thereafter, the computing device 1102 may execute instructions on the computing processor(s) 1106 to perform a simulation based on the drilling system, primitive, and other parameters selected or submitted by the user. The simulation may be performed using one or more of the methods set forth above. Executing the simulation generates a set of performance parameters (including various types of performance data, as discussed above). In some cases, the set of performance parameters generated may depend on the data selected or submitted by the user and may include instructions to generate specific performance parameters, as mentioned above. In other embodiments, the executed simulation may generate one or more performance parameters including, but not limited to, shock, vibration, rate of penetration (ROP), surface weight on bit (SWOB), downhole weight on bit (DWOB), axial relationships such as velocity, force, and acceleration, lateral relationships such as force, velocity, and acceleration, bit rotations per minute (RPM), among many others.

After simulation, one or more performance parameters may be visualized by the GUI 1112 on the output device(s) 1116. In one embodiment, the visual outputs may include tabular data of one or more performance parameters. Additionally, the outputs may be in the form of graphs and may be represented as percentages or ratios.

Once presented with the performance parameters, the user may modify a primitive parameter, such as a control relationship between one or more control points and/or elements of the primitive, a wellbore parameter, and/or drilling operating parameter, among many others. Modification may involve selecting a parameter from pre-existing values or inputting the parameter to obtain a modified value. The pre-existing values may depend on manufacturing capabilities or geometries of the primitive, among others.

According to some embodiments, at least one of the parameters submitted into a computer processor for designing a drilling system or drilling component of a drilling system may be modified based on one or more performance parameter from a previous simulation performed by the computer processor, wherein modifying includes changing a value of at least one input parameter to obtain a modified input parameter. A second performance parameter from a subsequent simulation may be presented on a graphical user interface, where the subsequent simulation is based on the modified input parameter. The performance parameters from each simulation may be compared to determine optimized input parameters.

In one or more embodiments, an input parameter may be modified using an optimizer 1118. The optimizer 1118 may be connected to the computing device 1102, or may be integral with the computing device 1102. The optimizer 1118 may also be connected to the computing device 1102 or accessibly by the computing device 1102 using network 1104. The optimizer 1118 may modify one or more input parameters during a simulation. For example, a simulation may be performed and the optimizer 1118 may modify one or more input parameters of a primitive during simulation. After modification, and while the simulation is being performed, the simulation may continue based on the one or more input parameters modified by the optimizer 1118.

Further, a user may specify particular constraints with respect to on one or more input parameters during simulation. When modifying, the optimizer 1118 may consider the constraints imposed by the user and may modify one or more input parameters based on the constraints. For example, a user may specify a particular range for a length of a primitive element. The user may specify the range based on design capabilities, manufacturing capabilities, performance or operating conditions, among many others. Once specified, a simulation may be performed and the optimizer 1118 may modify one or more input parameters such that the modification falls within the constraints specified by the user. For example, the user may define a particular length of a segment to be between 1 m and 1.5 m. The optimizer 1118 may vary the length of the primitive element between 1 m and 1.5 m during a simulation. Thereafter, performance data of the different lengths may be determined and/or compared in order to optimize the primitive design.

Further, the optimizer 1118 may modify one or more input parameters based on operating conditions and/or drilling performance, among many others. Thus, the optimizer 1118 may modify one or more input parameters such that a particular performance is achieved during simulation. For example, the optimizer 1118 may modify one or more input parameters to achieve a given ROP or WOB and may continue to modify parameters until the performance is achieved, or after a particular amount of time and/or rotations has been simulated. In some embodiments, the optimizer may modify input parameters of the drilling system to alter the arrangement of one or more primitives of the drilling system. In some embodiments, the optimizer may modify input parameters of the drilling system by selecting a different primitive and/or drilling component for use in the drilling system based on performance parameters determined from multiple simulations.

After modification, a second simulation may be executed by the computing device 1102. The second simulation may include the modified input parameter and/or a modified primitive to be simulated. The simulation may be executed by the computing device 1102 using the processor(s) 1106 to generate a second set of performance parameters. The simulation may be performed using one or more of the methods set forth above. Once generated, the initial set of performance parameters along with the second set of performance parameters may be presented using GUI 1112 and output device(s) 1116. The sets of performance parameters may be presented to the user for comparison and may be presented separately or combined. The sets of performance parameters may be presented or visualized using any tools known in the art, such as, for example, plots, graphs, charts, and logs.

Additionally, a second simulation may occur simultaneously with the first simulation. For example, an engineer may select any number of input parameters of a primitive and drilling component(s) to operate in particular wellbore and drilling operating conditions. The engineer may then run a number of simulations and compare resulting outputs (e.g., performance parameters) to one another. Furthermore, the simulation and thus, the comparison, may be done in real-time. More specifically, the engineer may run a number of simulations for a given drilling scenario and observe performance as the simulation progresses. Furthermore, performance parameters may be acquired and/or measured in the field. The results from one or more simulations may then be used to compare to one or more field acquired/measured parameters.

Once a primitive is modeled and/or simulated, a drilling component may be modeled based on the determined primitive design. For example, the GUI 1112 may use the input parameters of a primitive to model a drilling component having the same input parameters as the primitive. According to some embodiments, a system may include a second GUI, separate from a first GUI used to model a primitive, where input parameters of the primitive modeled with the first GUI may be submitted into the second GUI, and the second GUI may model a drilling component having the primitive input parameters. The modeled drilling component (based on the primitive modeled with the first GUI) may be simulated and optimized, as discussed above with respect to FIG. 12.

According to some embodiments, a computing system may have an external control system that may run in parallel with the computer-aided design software of the computing device 1102, which may pull inputs and outputs from the computer-aided design software into a second computing device. In other words, the external control system may provide the ability to interface with the computer-aided design software with an outside machine. For example, in some embodiments, an external control system may have a software program (e.g., Matlab) that runs in parallel with and is run on a computing system external to a computing system for designing a drilling system and/or drilling component of a drilling system using computer-aided design software. The software program of the external control system may put inputs into the computing system for designing a drilling system and/or drilling component of a drilling system (e.g., provide input parameters for one or more primitives) and/or pull outputs from the computing system for designing a drilling system and/or drilling component of a drilling system (e.g., extract performance parameters of one or more primitives). An external control system may be used to modify input parameters of a primitive and/or drilling system, for example, during optimization of the drilling system.

Examples of various methods using a drilling design tool to define and simulate a primitive of a drilling component for use in a drilling system are described below.

According to embodiments of the present disclosure, a method for designing a drilling component of a drilling system may include defining input parameters of a primitive of the drilling component. The input parameters may be defined using a drilling design tool. The input parameters may include at least one control relationship between a first control point or element of the primitive and a second control point or element of the primitive and/or at least one control relationship between a first control point or element of the primitive and a different primitive or pre-designed drilling component of the drilling system. In some embodiments, additional input parameters of the drilling system may also be defined, including but not limited to wellbore parameters, drilling operating parameters and BHA parameters. Once selected input parameters are defined, the primitive may be simulated (either alone, in combination with one or more other primitives and/or drilling components, or in operation with the drilling system). A drilling design tool according to embodiments of the present disclosure may be used to simulate the primitive.

In one or more embodiments, the results of a simulation may include performance parameters of the primitive at any point along the length of the primitive. In particular, after a primitive has been parameterized, the primitive may be simulated. For example, the primitive may be simulated in a number of drilling environments based on borehole properties, operating properties, and BHA/bit parameters, for example. During a drilling simulation, drilling performance may be measured, calculated, and/or output as performance parameters.

"Drilling performance" may be measured by one or more drilling performance parameters. Performance parameters may include selected measurements of operation. For example, drilling performance parameters include rate of penetration (ROP), rotary torque to turn the drilling tool assembly, rotary speed at which the drilling tool assembly is turned, drilling tool assembly lateral, axial, or torsional vibrations and accelerations induced during drilling, WOB, weight on reamer (WOR), forces acting on components of the drilling tool assembly, and forces acting on the drill bit and components of the drill bit (e.g., on blades and/or cutting elements). Drilling performance parameters may also include the torque along the drilling tool assembly, bending moment, alternative stress, percentage of fatigue life consumed, pump pressure, stick slip, dog leg severity, borehole diameter, deformation, work rate, azimuth and inclination of the well, build up rate, walk rate, and bit geometry. One skilled in the art, having benefit of this disclosure, will appreciate that other drilling performance parameters exist and may be considered without departing from the scope of the disclosure.

A drilling component based on a simulated primitive may be designed to have the same input parameters as the simulated primitive for use in a drilling system, for example, when a designer determines performance parameters of the simulated primitive meet selected criteria. In some embodiments, a drilling component based on a simulated primitive may be designed to have one or more modified input parameters of the simulated primitive for use in a drilling system, for example, when a designer determines performance parameters of the simulated primitive do not meet selected criteria.

According to some embodiments, at least one of the parameters submitted for a drilling simulation may be modified based on one or more performance parameter from the simulation, where modifying includes changing a value of at least one parameter to obtain a modified parameter. Subsequent performance parameter(s) may be determined from a subsequent simulation based on the modified parameter. Further, according to some embodiments, a method for designing a drilling component of a drilling system may also include selecting a performance criterion for the drilling system and altering at least one parameter in the simulation to meet the performance criterion, such as altering at least one of the input parameters for a primitive of the drilling component and/or at least one of the drilling system parameters used in the simulation.

Figure 5:
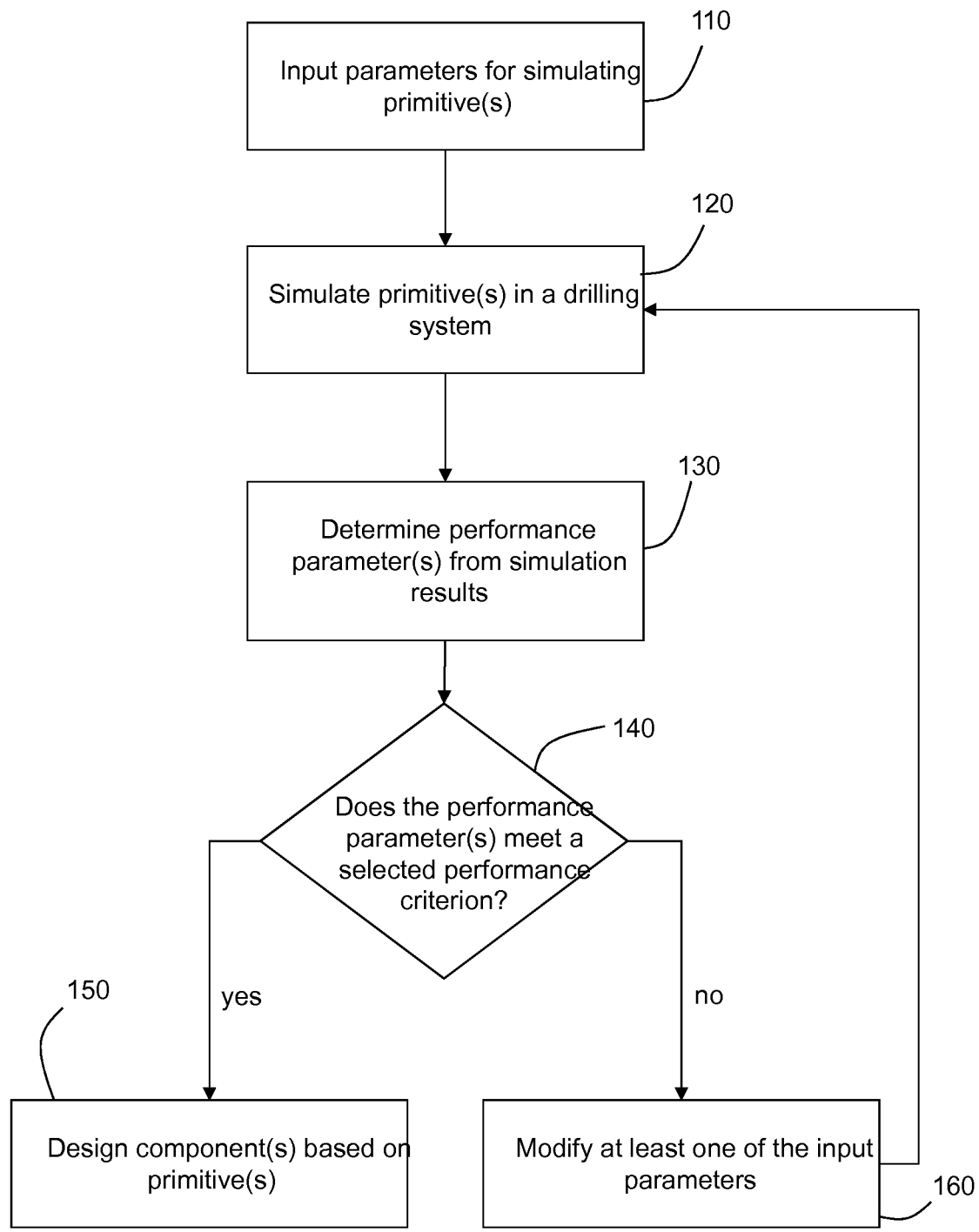
FIG. 5 shows a method of designing a drilling system in accordance with one or more embodiments of the present disclosure.

FIG. 5 shows an example of a method for designing a drilling component of a drilling system according to embodiments of the present disclosure. The method may include inputting parameters for simulating one or more primitives in a drilling system (110), for example, inputting the parameters into a computer-aided design software program. The one or more primitives in the drilling system may be simulated (120), for example in a first simulation, or in one or more subsequent simulations. From the simulation, one or more performance parameters may be determined (130).

The performance parameters may be compared to preselected performance criteria (140). Preselected performance criteria may include value limits, such as defined maximum or minimum values, or yes/no functions, such as whether or not a drilling component works. In some embodiments, preselected performance criteria may be met if a performance parameter result is an improvement over the performance parameter result of a previously executed simulation or of a real drilling operation. For example, a performance parameter determined for a drilling component of a real drilling operation may include the lifetime of the drilling component (i.e., the runtime of the drilling component until failing). In a simulation of a primitive of the drilling component type, the lifetime performance parameter of the primitive may meet a selected performance criterion when the lifetime of the primitive in the simulation is longer than the lifetime of the drilling component in the real drilling operation.

If the performance parameters determined from the simulation of the primitive meets the preselected performance criteria or achieves a desired result, then the input parameters used to create the simulation of the primitive may be used to design a drilling component (150). In other words, a drilling component may be designed based on a primitive by providing the drilling component with the same input parameters that were used to design the primitive. If the preselected performance criterion was not met from a first simulation, at least one input parameter may be modified (160), and a second simulation may be performed using the modified input parameter. For example, at least one input parameter of the primitive may be modified and/or at least one input parameter defining the drilling system, such as wellbore parameters, BHA parameters, bit parameter, and drilling operating parameters, may be modified. If the preselected performance criterion is met from the performance parameters of the second simulation, a drilling component may be designed based on the modified input parameters. If the preselected performance criterion is not met from the second simulation, subsequent input parameter modifications and subsequent simulations may be conducted.

For example, if the performance parameters determined from the simulation of the primitive meets preselected criteria or achieves a desired result, then the input parameters used to create the simulation of the primitive may be used to design the drilling component. In other words, a drilling component may be designed based on a primitive by providing the drilling component with the same input parameters that were used to design the primitive. For example, input parameters used to define a primitive may include various control relationships, as described above, between selected control points and/or elements of the primitive. A drilling component design based on the primitive may have the same defined input parameters, including the same control relationships, as the primitive. In some embodiments, after determining performance parameters from a simulation of one or more primitives (130), at least one of the input parameters may be modified (150), and a subsequent simulation may be performed based on the modified parameters.

According to embodiments of the present disclosure, performance parameters of a simulation of a drilling system may be optimized by modifying input parameters for one or more primitives in the drilling system and/or by modifying input parameters of the drilling system, such as described above, or by defining input parameters for a different primitive than was initially simulated. For example, a first simulation may be used to simulate a first primitive in a drilling system, where the first primitive is a primitive form of a first drilling component type. Different input parameters may be entered to define a second primitive of a second drilling component type to simulate the second primitive in the drilling system. The performance parameters of the first and second simulations (or any other simulations conducted) may be compared to determine an optimal primitive in the drilling system.

According to some embodiments, performance parameters may be optimized by altering the arrangement of one or more primitives within a drilling system. For example, input parameters may be submitted into a management application (e.g., using a computer processor and simulation software) for modeling a drilling system having one or more primitives in a first arrangement within the drilling system. Performance parameters may be determined from a first simulation of the drilling system in the first arrangement. Modified input parameters defining the drilling system having a second arrangement may then be submitted, where the second arrangement is different than the first arrangement. For example, the second arrangement may have one or more primitives located in different positions from that in the first arrangement and/or the drilling system may have one or more components arranged differently around one or more primitives. A second simulation may be performed using the modified input parameters and the performance parameters from the second simulation may be compared with the performance parameters from the first simulation to determine the optimized arrangement of the drilling system.

For example, according to some embodiments, a drilling system designer may want to determine how the drilling system would perform if a new drilling component was introduced into the drilling system. To determine performance of the modified drilling system, the designer may input parameters of a primitive of the new drilling component in the drilling system. For example, if testing how the drilling system would perform with a mud motor, a primitive of a mud motor may be used in simulation of the drilling system with the mud motor. The mud motor primitive may have two or more control points and control relationships defined between the control points (e.g., relative torque, speed and tension between two ends of the mud motor primitive). The drilling system having the mud motor primitive may then be simulated according to embodiments of the present disclosure to get a general idea of how the drilling system would react with a mud motor having certain defined properties (defined by the input parameters). Thus, by modeling the drilling system with a primitive of a mud motor rather than a completely modeled mud motor (which may take more time and cost to develop for simulation), a high level design of the drilling system having a mud motor may be provided. If the high level design provided meets certain performance criteria or achieves a desired result, more particular or optimized properties of the mud motor in the drilling system may be determined and optionally simulated as a completely modeled mud motor. Although a mud motor is used in explaining this example of using a drilling component primitive, other primitives may be used in the design of drilling systems and/or drilling components. For example, a primitive may be used to represent universal joints, actuators, motors, stabilizers, and other drilling components useful in drilling systems.

In some embodiments, a jar may be modeled as a primitive. The impact mass and drive of the jar may be scaled to design the right jarring profile of the primitive, which may then be used as a high level system requirement for the actual mechanical system. For example, the parameters of the jar primitive may be the mass of the impact mass, strain energy, distance of mass travel and compliance at impact point. Once the jar primitive is designed to achieve desired performance, the parameters of the jar primitive may be used to design the jar component, which may be manufactured and used in the actual drilling system.

In some embodiments, a rotary steerable system may be designed by using a representation (primitive) of a collar with pad actuators placed close to the bit. The primitive may be modeled and simulated to determine the stroke, forces and speed of actuation that result in an acceptable or desired steering. The determined stroke, forces and speed of actuation of the primitive to achieve a certain steering may be used to design and manufacture a real/physical collar with pad actuators placed close to the bit having the same stroke, forces and speed of actuation.

In some embodiments, a primitive of a drilling tractor may be developed having pads that grip and pull on the borehole wall. The primitive may be used as a high level model to determine the radial gripping forces and axial pull required to drill at a required rate. A designer may then base a design of an actual drilling system to have the determined radial gripping forces and axial pull from the primitive design.

Using a high level system perspective, a primitive may be shaped or otherwise designed until the primitive is actually capable of achieving a worthwhile and valuable function in the context of a realistic drilling environment provided by the simulation software. If an actual or physical drilling component is capable of mimicking or performing designed parameters of a primitive of the drilling component, it is more likely that the drilling component may achieve the designed objectives in a real drilling system. Likewise, if a real drilling system is capable of performing designed parameters of a simulated drilling system using one or more primitives, it is more likely that the drilling system may achieve the overall system drilling objectives in a real drilling system. Although a physical drilling component may be designed to have the same parameters as a primitive of the drilling component or to achieve the same performance parameters as the primitive of the drilling component, actual reduction to practice or manufacture of the drilling component may result in small deviations from the design, such as from manufacturing tolerances. According to embodiments of the present disclosure, a physical drilling component designed based on parameters of a primitive of the drilling component may include the physical drilling component having the same or substantially similar parameters as the primitive.

As another example, a primitive of a shock-sub may be developed as a basis for the design of a physical shock-sub. Previously designed shock-subs to dampen out shocks within a drill string had been designed to include an axially compliant spring and dampening (to withstand the axial and bending loads in the drill string), but were found to be ineffective when used in real drill strings the dynamic behavior within the total drilling context had not been accessed. However, according to embodiments of the present disclosure, a primitive of a shock-sub may be developed as an axially compliant spring/damper for use within a wide range of drilling systems using modeling or simulation software to determine which high level system parameters successfully achieves dampening of drill string vibrations. The successful design of the primitive may then be used as the basis for designing a physical shock-sub (i.e., a physical shock-sub is designed to have the same parameters as the primitive of the shock-sub). In a similar example, while use of an elastomer may have previously been thought as a suitable material to use in the load path of a shock-sub, design and testing of the primitive shock-sub (using modeling or simulation software, as described herein) may show that the mechanical power needing to be handled by the elastomer is too high and may cook itself to destruction. Based on the results from the primitive simulation, an engineer may search for a different dampening approach, such as use of magnetorheological fluids, to meet the performance parameters resulting from simulation of the shock-sub primitive when designing the physical shock-sub.

As another example, a primitive may be used to design a drilling component that has not yet been devised, such as new downhole drive mechanism. A primitive of the motor may be modeled and simulated to determine design parameters of a drilling system using the motor primitive and having one or more pre-selected performance parameters. For example, a simulation of the drilling system with the motor primitive may be set to have a pre-selected drive speed. From the simulation, one or more other parameters may be determined that achieve the pre-selected drive speed, such as torque characteristics and what kind of stabilization may prevent the drill string from shaking A designer may then try to determine if a motor and other drilling components, such as actuators or stabilizers, may be designed that are capable of achieving the simulated parameters.

Parameters of a drilling system may be nested, or in other words, some parameters of a drilling system are more important and less avoidable than other parameters of the drilling system. For example, if a motor driving a bit needs a certain speed versus torque profile, then such parameters may take precedence over other parameters, such as selection of component types (e.g., a turbo drill, a mud motor, simple surface rotary or an electric motor).

As another example, according to some embodiments of the present disclosure, a drilling system designer may want to determine how the drilling system would perform if one or more components were re-arranged in the drilling system. To determine performance of the modified drilling system, the designer may input parameters of primitives of one or more drilling components and alter the arrangement of such primitives within the drilling system. The performance results of each arrangement may be used to provide a general idea of which arrangement may work best for the desired purposes of the drilling system. By using primitives to simulate performance of the different arrangements, the designer may avoid the increased costs and time that it would have otherwise taken to completely model each component and arrangement of the components in a drilling system.

When designing complete drilling systems, the design of the individual sub-systems (such as operation of individual drilling components) may be inter-dependent on their position within a drill string, and it may be important to understand up front as part of the high level specification some high level parameters like torque and load. For example a mud motor (a long piece of equipment that increases the distance from the bottom of a drilled hole to measurement sensors above) may be positioned at different points along a drill string. A designer may want measurement sensors positioned relatively closer to the bit. However, if the measurement sensors are positioned beneath the mud motor, a more powerful and stronger mud motor would be needed to turn the extra inertia against friction, and the measurement sensors would be spun at bit speed (whereas before, above the motor, the measurement sensors turned more slowly). Thus, the shock and vibration experienced by the measurement sensors, as well as the fatigue of the measurement sensors and connections, may be increased by moving the measurement sensors below the mud motor. Such high level system parameters may be ascertained before building a motor or a measurement sub using primitive simulation methods according to embodiments of the present disclosure.

Input parameters may be modified to optimize performance parameters or determine an optimal arrangement of primitives in a drilling system, as discussed above, or input parameters may be altered to achieve different simulations, for example, to reflect a changing trajectory of a borehole or to reflect different drilling conditions.

For example, during drilling, it may be desired to change the trajectory of a borehole. In some cases, it may be desired to change the trajectory of a substantially vertically drilled borehole to a substantially horizontally drilled borehole (or vice versa). The transition from vertical drilling to horizontal drilling (or vice versa) is known as directional drilling. Directional drilling involves certain terms of art, which are presented below for information.

The method used to obtain the measurements to calculate and plot a 3D well path is called a directional survey. Three parameters are measured at multiple locations along the well path—measure depth (MD), inclination, and hole direction. MD is the actual depth of the hole drilled to any point along the wellbore or the total depth as measured from the surface location. Inclination is the angle, measured in degrees, by which the wellbore or survey-instrument axis varies from a true vertical line. An inclination of 0° would be true vertical, and an inclination of 90° would be horizontal.

Hole direction is the angle, measured in degrees, of the horizontal component of the borehole or survey-instrument axis from a known north reference. This reference is true north, magnetic north, or grid north, and is measured clockwise by convention. Hole direction is measured in degrees and is expressed in either azimuth (0 to 360°) or quadrant (Northeast (NE), Southeast (SE), Southwest (SW), Northwest (NW)) form.

The "build rate" is the positive change in inclination over a normalized length (e.g., 3°/100 ft.). A negative change in inclination would be the "drop rate."

A long-radius horizontal well is characterized by build rates of 2 to 6°/100 ft, which result in a radius of 3,000 to 1,000 ft, respectively. This profile may be drilled with conventional directional-drilling tools, and lateral sections of up to 8,000 ft have been drilled.

Medium-radius horizontal wells have build rates of 6 to 35°/100 ft, radii of 1,000 to 160 ft, respectively, and lateral sections of up to 8,000 ft. These wells are drilled with specialized downhole mud motors and conventional drill-string components. Double-bend assemblies are designed to build angles at rates up to 35°/100 ft. The lateral section is often drilled with conventional steerable motor assemblies.

Short-radius horizontal wells have build rates of 5 to 10°/3 ft (1.5 to 3°/ft), which equates to radii of 40 to 20 ft, respectively. The length of the lateral section varies between 200 and 900 ft. Short-radius wells are drilled with specialized drilling tools and techniques. This profile is most commonly drilled as a re-entry from any existing well.

When drilling a long horizontal well (not necessarily a long-radius horizontal well), WOB may not effectively be transferred from the surface to the bit due to the large horizontal distance and axial friction from the drillstring. In addition, as the length of a well increases, the ROP of a drill bit may be reduced as WOB and/or surface RPM capabilities may not be sufficient in maintaining a specific ROP. Further, in long substantially horizontal wells, friction acting on the drill string, BHA, and/or drill bit may deleteriously affect the performance of the drilling operation and drill string and bit wear may be amplified. Of course, those having skill in the art will appreciate that many other reasons may affect the performance and/or drilling operation.

According to embodiments of the present disclosure, one or more simulations may be performed to determine optimized parameters for directional drilling. For example, input parameters defining a directional drilling system may be submitted into a management application using a drilling design tool according to embodiments of the present disclosure. The drilling design tool may be used to simulate one or more primitives in the directional drilling system and output performance parameters, including, for example, the trajectory of the borehole. Based on the performance parameters, one or more input parameters may be modified. Subsequent simulations may be performed using modified input parameters to provide optimized performance parameters. For example, a designer may want to improve the load transfer to a bit by coming up with a new type of agitator to dynamically break friction when sliding a mud motor using a primitive for a collar having an oscillating mass. Using a primitive of an oscillating mass in a collar, the designer may determine the frequency and magnitude of the cyclic force and the optimum positions for the agitators in a drill string to achieve the pre-selected load transfer before the design of the physical drilling components are considered.

In one or more embodiments, the simulation provides visual outputs of performance parameters. Further, the outputs may include tabular data of one or more performance parameters. In addition, the outputs may be in the form of graphs, charts, and/or logs, of a performance parameter, with respect to time, or with respect to location along the drill string, for example.

Other plots may include presentation or visualization of the results at a minimum or maximum value, or any combination of those results. A graphical visualization of the drill bit, drill string, and/or the drilling tools (e.g., a hole opener) may also be output. The graphical visualization (e.g., 2-D, 3-D, or 4-D) may include a color scheme for the drilling system and the primitive of a component of the drilling system to indicate performance parameters at locations along the length of the drill string, for example.

According to embodiments of the present disclosure, one or more drilling components of a drilling system may be designed based on primitives modeled or simulated in the drilling system. For example, input parameters may be provided for modeling and/or simulation of one or more primitives of a drilling system, and one or more drilling components may be designed based on each of the primitives modeled or simulated by designing each component to have the same parameters that were submitted for each respective primitive on which the drilling component is based.

A drilling component that is designed based on a primitive according to embodiments of the present disclosure may further be simulated or modeled. For example, a drilling component may be modeled to have the same parameters that were submitted in designing the primitive of the drilling component (including any optimized parameters that may have been submitted). One or more additional design parameters may be added to the drilling component design, for example, material compositions, cutting element types, amounts and positions, as well as other design aspects of the drilling component that may or may not have been represented in the design of the corresponding primitive. The drilling component may be simulated and input parameters of the drilling component simulation may be modified to optimize performance of the drilling component based on simulation results.

Figure 6:
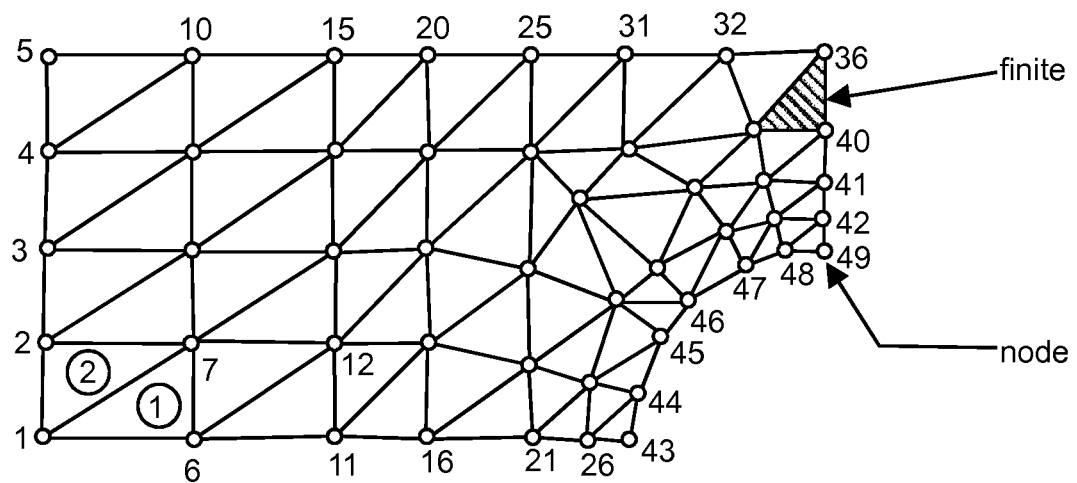
FIG. 6 shows a visualization of a finite element analysis in accordance with one or more embodiments of the present disclosure.

For example, in some embodiments, a drilling system and/or a drilling component of the drilling system may be modeled and simulated, where one or more drilling components of the drilling system is based on a primitive design and/or primitive simulation. The drilling system and/or drilling component of the drilling system may be modeled with beam elements (using finite element analysis (FEA) techniques as known in the art). Briefly, FEA involves dividing a body under study into a finite number of pieces (subdomains) called elements. Such a division is shown in FIG. 6, for example.

Particular assumptions are then made on the variation of the unknown dependent variable(s) across each element using so-called interpolation or approximation functions. This approximated variation is quantified in terms of solution values at special element locations called nodes.

Through this discretization process, the method sets up an algebraic system of equations for unknown nodal values which approximate the continuous solution. Because element size, shape and approximating scheme can be varied to suit the problem, the method can accurately simulate solutions to problems of complex geometry and loading.

Each beam element has two nodes. For a MWD/LWD tool, for example, the tool is divided into beam elements, based on the geometry of the tool and sensor locations. The nodes are located at the division points of the elements. During the simulation, a wellbore may be drilled by the bit and propagates as the bit progresses. The drilling system and/or drilling component may be confined in the wellbore. The drilling system and/or drilling component may move dynamically during the simulation, depending on the loading and contacting conditions as well as initial conditions.

When the drilling system and/or drilling component moves in the well bore, the nodes will have history of accelerations, velocity, and displacement, etc. The location of the nodes referencing to the well center or wellbore can be determined. Representative results that are produced by the simulation may include accelerations at the bit, drill, stabs and other locations; velocities at the bit, drill, stabs and other locations; displacements at the bit, drill, stabs, and other locations; the trajectory of the bit, drill, stabs, and other locations; torque of the bit, drill, stabs, and other locations; and contact force of the bit, drill, stabs, and other locations. One or more of these results may be produced in the form of time history, box and whisker plots, 2D or 3D animations, and/or pictures, among many others.

Further, in one or more embodiments, a drilling system having one or more primitives or a primitive of a drilling system component may be input to a simulation having input parameters associated with a given oilfield system. A simulation may then be performed based on a drilling system operating in the field and performance results may be determined and output. The simulation may be performed simultaneously with a drilling system operating in the field and may be performed in real-time. The simulation may then be used and/or analyzed by a designer, user, or engineer in order to test different input parameters. In doing so, a designer may modify one or more input parameters in order to optimize the performance of the simulation. Thereafter, the drilling system in the field may also be modified in a similar manner in order to optimize performance in a particular oilfield operation.

In addition, a simulation having input parameters that correspond to a drilling system in the field may be performed faster than real-time. Accordingly, during simulation, input parameters may be modified to optimize performance of the simulation. Thereafter, similar modification may be made to the drilling system in the field in order to account for upcoming drilling conditions. For example, a user may simulate a drilling system and modify the ROP to achieve a particular WOB when drilling through a specific formation. Once optimal input parameters are achieved, the drilling system in the field may be modified based on the optimal input parameters achieved during simulation just prior to drilling through the specific formation. Thus, when the drilling system in the field encounters the specific formation, the input parameters to achieve a particular WOB will have already been accounted for and the WOB may be maintained when transitioning drilling from one formation to another. When the drilling system in the field and capable of optimizing performance of the simulation and may modify the performance of the drilling system in the field.

In other embodiments, primitive parameters may be modified and/or the position of one or more primitives may be modified during simulation to achieve a particular performance. In some cases, the modified parameters may not be able to be modified in a drilling system in the field. Thus, the modified parameters may be stored for use in another phase of the same oilfield operation or for a different oilfield operation. Thus, although a number of input parameters may be modified during simulation, some input parameters may not be capable of modification during drilling in the field. As such, engineers may optimize alternative parameters in order to achieve a similar performance or may include the optimized parameters in planning of another oilfield operation.

Accordingly, embodiments of the present disclosure, allow a user to design and compare and contrast performance characteristics of a drilling system and/or one or more components of a drilling system under various wellbore conditions and drilling operation conditions. In addition, two or more components of a drilling system may be designed, modeled, and simulated separately or concurrently based on design of component primitives and performance data may be output for a drilling system that includes multiple components designed by a user and/or optimized in accordance with present disclosure.

Further, engineers may develop and analyze tools, BHAs, systems and/or components that may be based on concepts, designs, or any other idea that may not have been possible without extensive cost and/or resources by using primitive modeling and simulation methods disclosed herein. Engineers may then modify the components and their corresponding properties to improve, modify, or remove deleterious effects when performing a simulation or a particular oilfield operation.

By allowing a user to design a drilling system with one or more primitives of the drilling system components and review performance data of particular designs, modifications to the designs may be made prior to more detailed modeling and/or simulation of the components and manufacturing of the components, and the overall performance and efficiency of a particular field operation may be improved.

Particular examples of various implementations using methods and systems of the present disclosure are provided below. While particular drilling component types and parameter types and ranges may be referred to in the examples, one of ordinary skill in the art will appreciate that other drilling component types and other parameter types and ranges may be used with the methods and systems disclosed herein. These examples are merely given to provide clarity and examples of how methods and systems of the present disclosure may be used.

Figure 7:
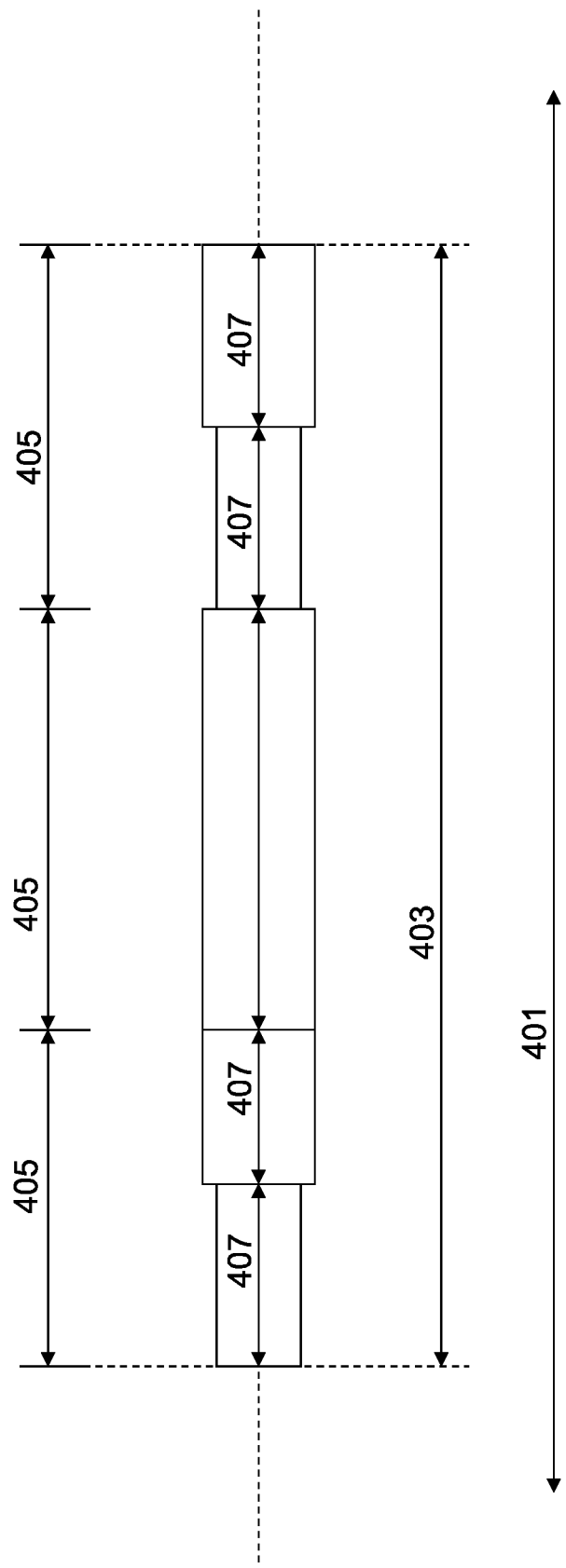
FIG. 7 depicts an example of a primitive in accordance with one or more embodiments of the present disclosure.
Figure 8:
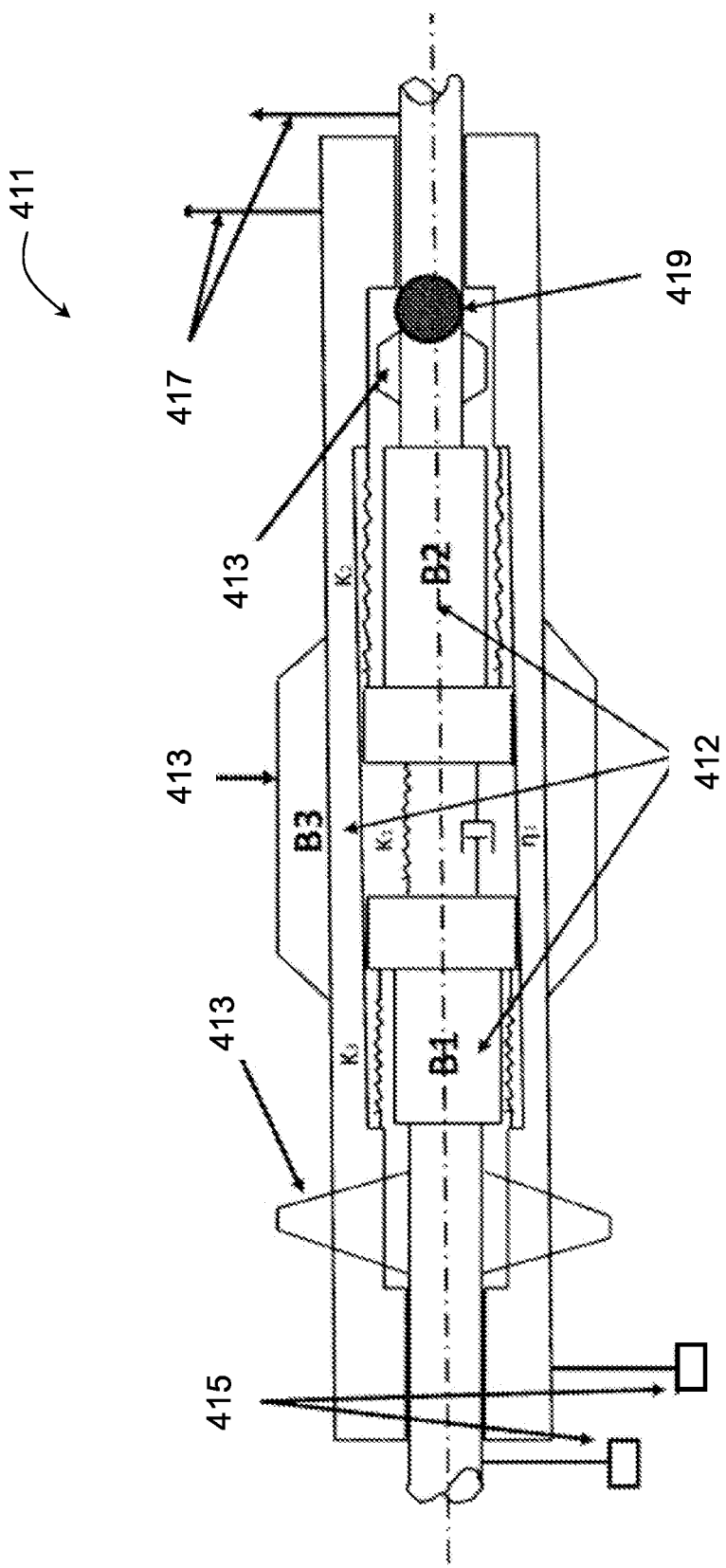
FIG. 8 depicts an example of a model in accordance with one or more embodiments of the present disclosure.

Referring to FIGS. 7 and 8, designs for a drilling component of a drilling system in accordance with one or more embodiments are shown. In one or more embodiments, one or more of the elements shown in FIGS. 7 and 8 may be omitted, repeated, and/or substituted. Accordingly, embodiments of the present disclosure should not be considered limited to the specific arrangements of elements shown in FIGS. 7 and 8.

As shown in FIG. 7, a primitive 401 of a drilling component for use in a drilling system includes a sub-primitive 403 element. The sub-primitive 403 may have the general form or shape of a pipe, a stabilizer, a collar, or any other drilling component or sub-component. The sub-primitive 403 may include one or more segments 405, each of which may include one or more sub-segments 407. In some cases, segment 405 may not include any sub-segments. The sub-segments 407 may be used to divide a segment 405 based on material characteristics and/or geometry (such as inner diameter and outer diameter), for example. Although not shown, the sub-segments 407 may further be divided into one or more fundamental elemental units used in finite element analysis ("FEA"), as shown in FIG. 6. Accordingly, a primitive 401 of a drilling system may be divided into one or more sub-component 403 elements, each of which is further divided into segments 405 having one or more sub-segments 407.

Referring now to FIG. 8, a three body construction model for designing a drilling component of a drilling system is shown. As shown, the model includes a primitive 411 having three bodies B1, B2, and B3, i.e., sub-primitives 412. In one or more embodiments, bodies B1 and B2 are primitives of upper and lower shafts, respectively, that are capable of connecting to a drill string or a portion of a drill string (not shown) to be modeled or simulated. In addition, body B3, as shown, includes a housing that surrounds a portion or an entirety of either or both of bodies B1 and B2. Each of the bodies B1, B2, and B3 can include a tubular, bent house, and/or a stabilizer, among many other properties known in the art. Further, body B3, instead of bodies B1 and B2, may be connected to a drill string or a portion of a drill string or both bodies B3 and B2, and bodies B3 and B1 may be connected, on either end, to a drill string or a portion of a drill string.

In addition, drilling components or primitives of additional drilling components, such as a stabilizer (e.g., stabilizer blades 413), one or more pads 415, and one or more u-joints 419 may be included when designing and simulating the primitive 411. A u-joint 419 may be designed to transfer torque loads from one drilling component, sub-component, or segment to another. The u-joint 419 may be of any material composition known in the art and may include one or more pins, seals, or other joint components known in the art. The stabilizer 413 and pads 415 may be designed to act on a wall of a borehole or on an inner diameter of body B3. In one or more embodiments, stages may be defined in which the stabilizer 413 and/or pads 415 may be activated and/or deactivated. Further, forces 417 acting on particular portions of the primitive 411 may also be considered during design and applied accordingly to the primitive 411 during simulation. Additional drilling components may also be designed (such as by using primitives of the additional drilling components, as disclosed herein) and/or added to the simulation, such as, but not limited to, jars, accelerators, shock absorbers, steering system, servo motors, and joints, among many others.

Between each of the bodies B1, B2, B3, different constraints and/or loading conditions may be applied when designing and/or simulating. The constraints and loading conditions may include force, torque, displacement, velocity, rotation, rotational velocity, spring and damper, and contact, for example. As such, a drilling system, may be designed, modeled, and simulated by defining control relationships between a number of primitives, primitive elements (e.g., sub-primitives, segments, and sub-segments) and/or control points on the primitive(s) to represent the constraints and/or loading conditions. One or more drilling components may then be designed based on the defined control relationships of each primitive for use in the drilling system.

Referring now to FIGS. 9A-9F, control relationships of a primitive in accordance with one or more embodiments is shown. In one or more embodiments, one or more of the elements shown in FIGS. 9A-9F may be omitted, repeated, and/or substituted. Accordingly, embodiments of the present disclosure should not be considered limited to the specific arrangements of elements shown in FIGS. 9A-9F.

Figure 9A:
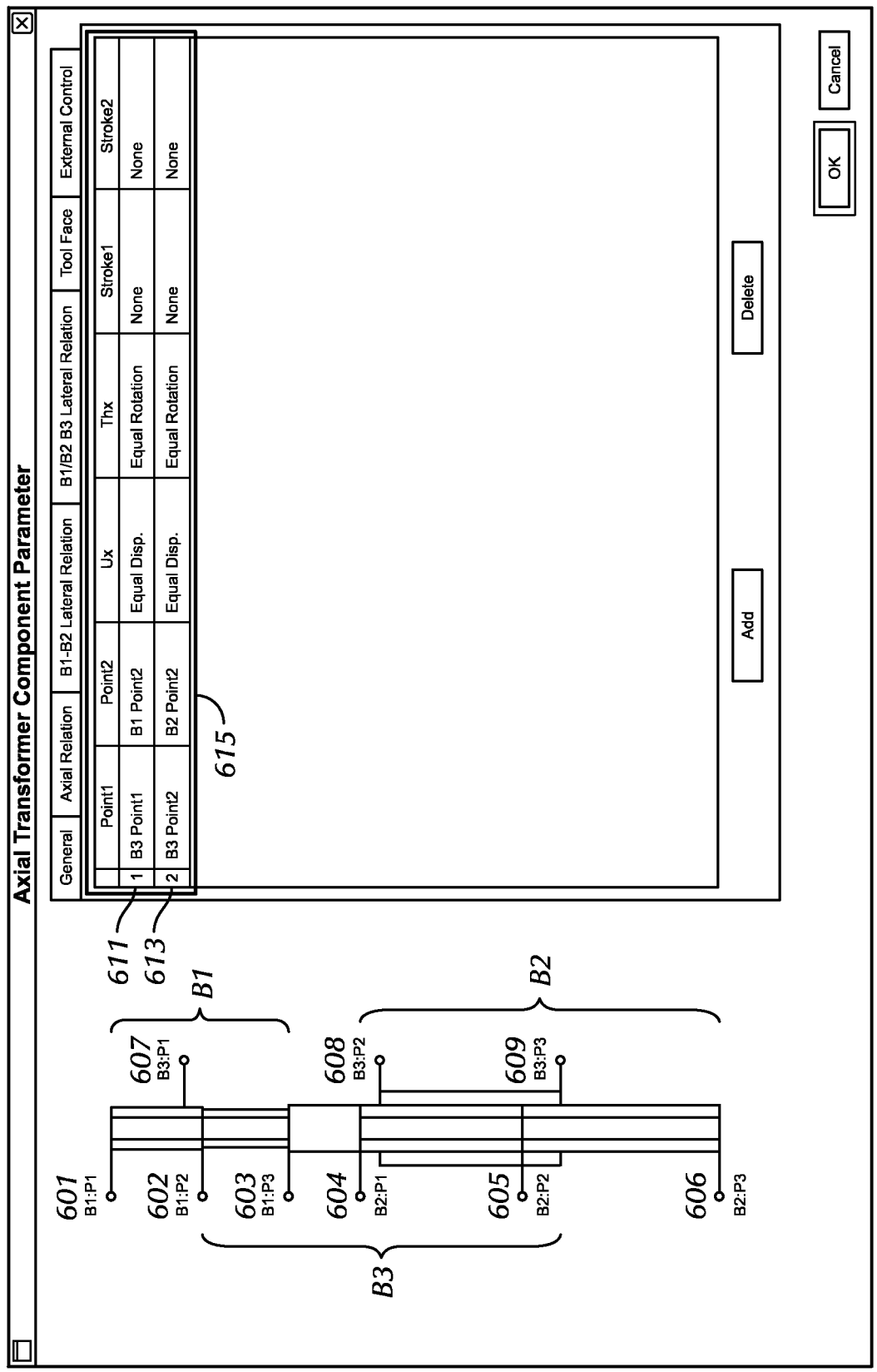

As discussed above, control points of a primitive may be determined by a user when designing a drilling system and/or a drilling component of a drilling system. As shown in FIG. 9A, control points 601, 602, 603, 604, 605, 606, 607, 608, and 609 are defined with respect to end points of segments of bodies B1, B2, and B3. Once control points are defined, control relationships between two or more control points may be determined. For example, a control relationship 611 may be defined between control point 607 and control point 602, as shown. In addition, a second control relationship 613 may be defined between control point 608 and control point 605. Although not shown, relationships between any two control points may be determined. For example, two control points may be on a single primitive, spaced a distance apart, or each of two control points may be on different primitives and/or drilling components in a drilling system.

Control relationships may also be defined between one or more control points and one or more segments. For example, body B1 may move with respect to body B3. Accordingly, a user may define one or more control points of B1 and specify each of the control points to have a displacement (equal or difference) with respect to body B3, as opposed to specifying a control relationship of a control point of B1 with respect to a control point of body B3. As such, a number of different control relationships between one or more control points and one or more segments may be defined.

Figure 9B:
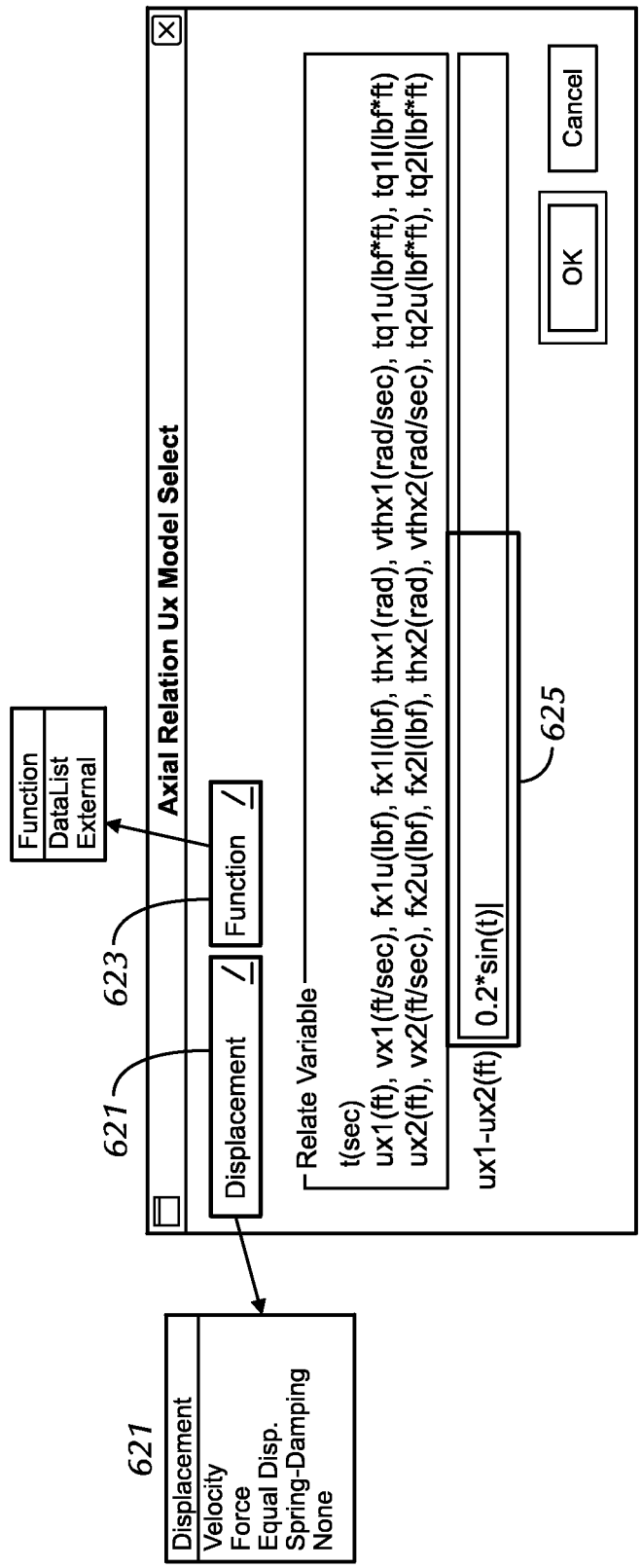

Each of these control relationships may be determined and input by a user. For example, as shown in FIG. 9A, control relationships 611 and 613 may include an axial relation 615. As shown in FIG. 9B, the axial relationship may include a displacement relationship in which a displacement difference function may be determined when a displacement of one control point is different than a displacement of a second control point. In some cases, an equal displacement control relationship may be determined when a displacement function acts equally on both control points. Similarly, the axial relationship may include a velocity relationship between two control points in which the velocity difference between the two control points is determined. The axial relationship may also include a force relationship between two control points in which a force may be applied to either or both of the control points. Similar to the force relationship, a spring-dampening relationship may be determined between two control points in which a spring force function is applied to the two control points. Further, a stroke relationship may be determined when the two control points are within a given distance of one another.

The axial relationship may be selectable by a user from a drop down menu 621. In some embodiments, the relationship between two control points may be functional and based on one or more variables and may be selectable by a user from a drop down menu 623. In other embodiments, the control relationship may be defined by a data list or by an external control, as shown.

Figure 9C:
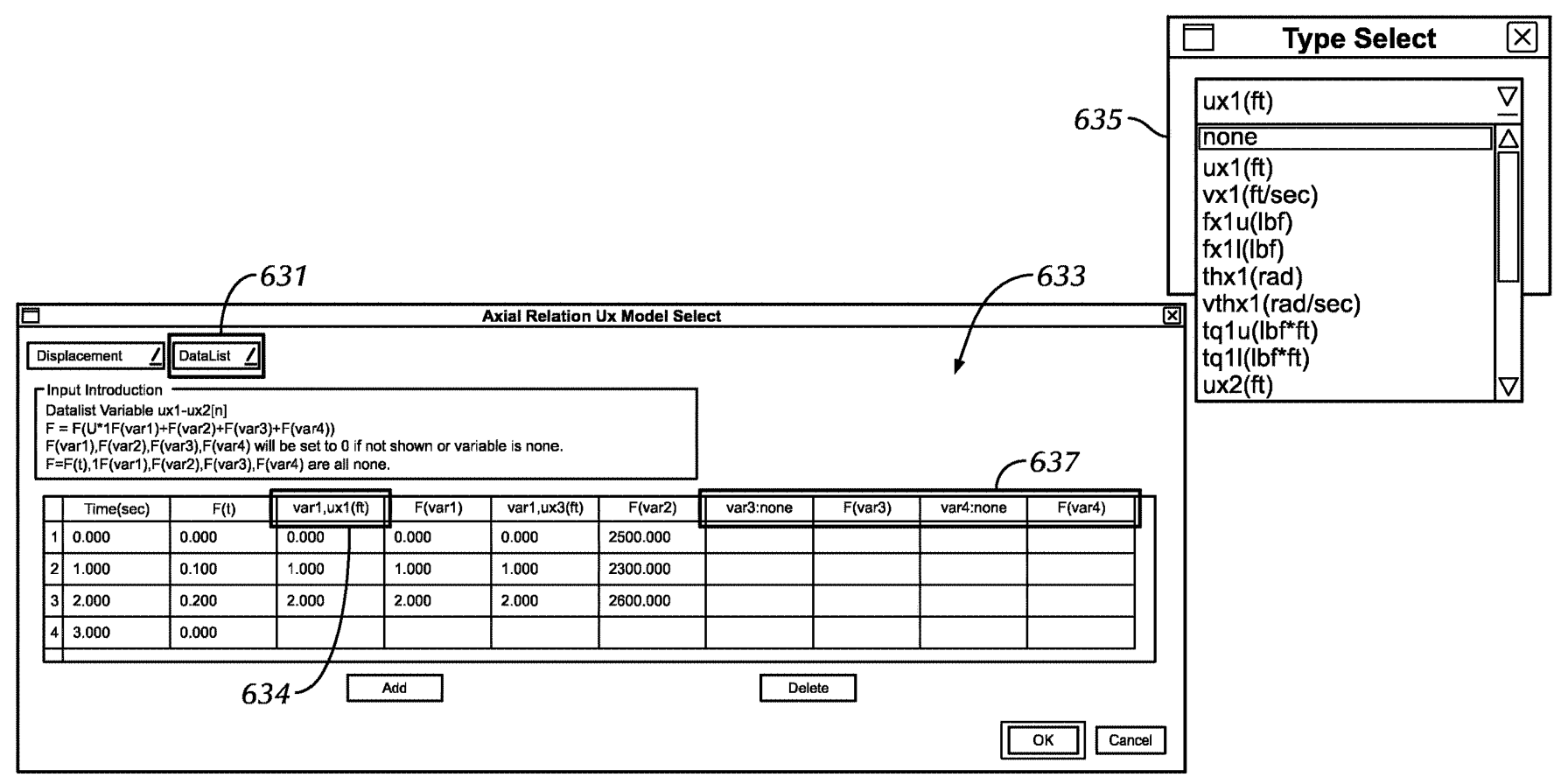

If a functional relationship is determined, a user may input the control relationship at 625 based on known functions (sine, arcsine, cosine, tangent, etc.). In some embodiments, as mentioned above, a control relationship may be defined by a data list. As shown in FIG. 9C, a data list may be selected from drop down menu 631 in a model select window 633. The functional relationship may be defined in terms of a number of variables and is of the form:

$$F=F(t)\cdot(F(\text{var1})+F(\text{var2})+F(\text{var3})+F(\text{var4})) \tag{1}$$

Figure 9D:
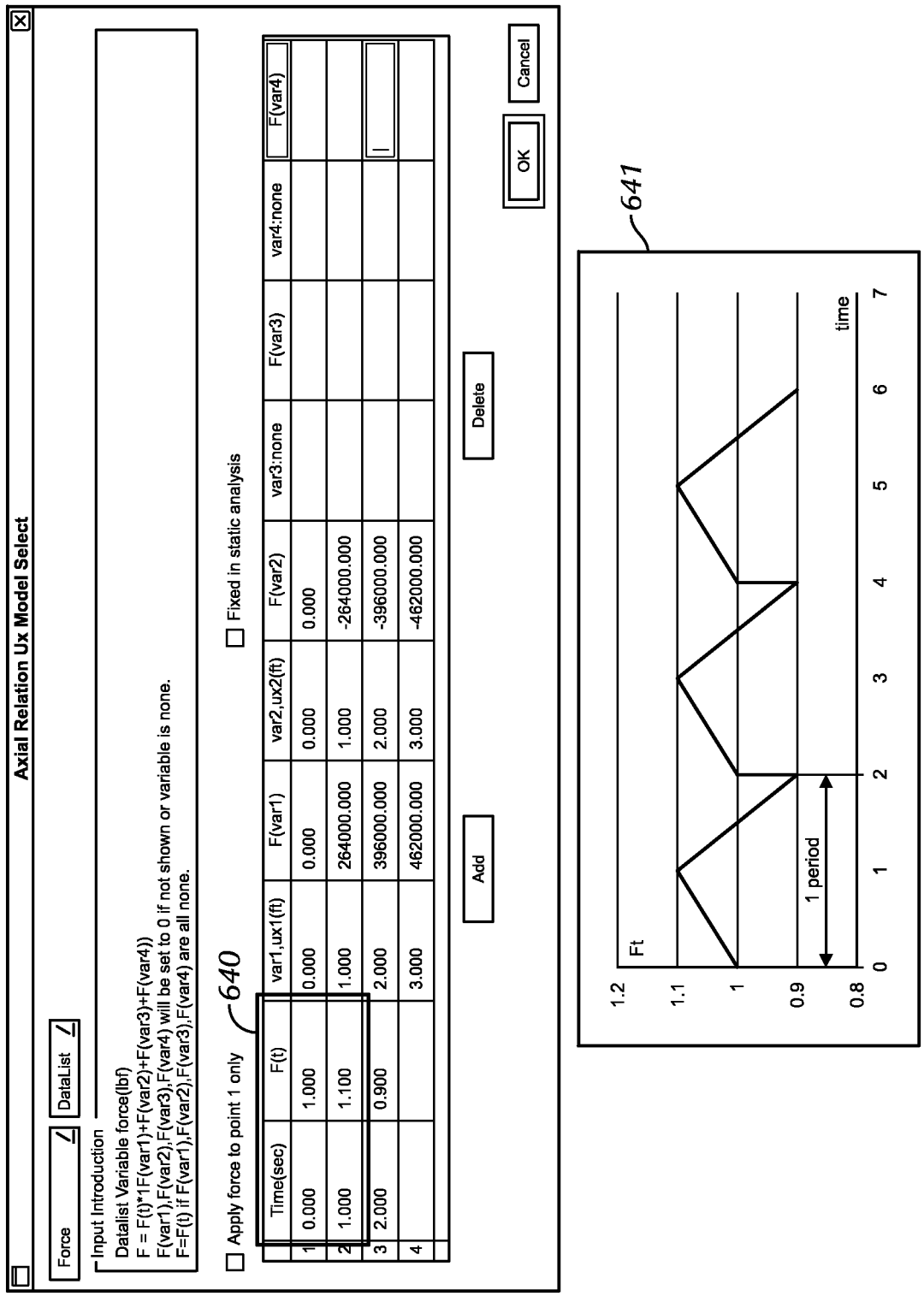

In FIG. 9C, variables may be selected using selection menu 635. For example, var1 634 as well as additional variables var2, var3, and var4 637 may be selectable using menu 635. Referring to FIG. 9D, time varied function F(t) may be determined and/or defined using data list 640. Further, when defining using the data list 640, function F(t) may be interpolated and/or extrapolated using any methods known in the art. For example, the function F(t) may be defined based on a known relationship or a defined function, such as the function shown in plot 641. In addition, function F(t) may be a periodic function or any other defined data table, plot, or chart, among many others known in the art.

An external control may also be included when determining a control relationship between two control points. For example, an external software program may include instructions for controlling the relationship between two control points. Further, the external software program may include real-time or on-the-fly instructions based on one or more control relationships and/or functions and their behaviors, such as displacements, velocities, forces, torques, etc. and may be output from each of the control points.

Figure 9E:
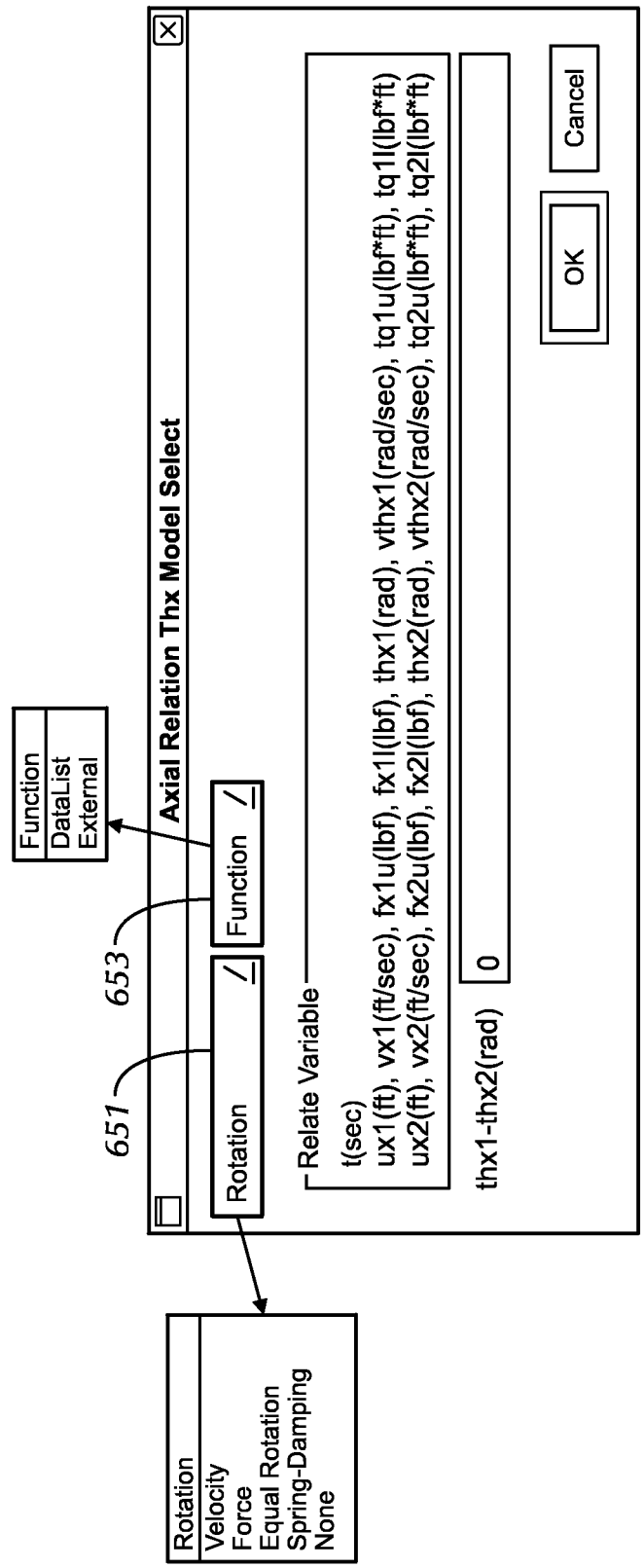

In one or more embodiments, an axial relationship may include an angular or rotational relationship about a longitudinal axis of the component and/or drill string. As shown in FIG. 9E, the axial relationship may include a rotation relationship in which an angular difference (in degrees, for example) may be determined between two control points. Similar to the above, rotation between two control points may be equal. In addition, a rotational velocity and spring dampening relationship between two points may be determined as well as a torque relationship between two points which may be applied to one or both of the control points. The axial relationship may be selectable by a user from a drop down menu 651.

As described above, in some embodiments, the control relationship between two control points may be functional based on one or more variables and may be selectable by a user from a drop down menu 653. In other embodiments, the control relationship may be defined by a data list or by an external control, as shown.

Figure 9F:
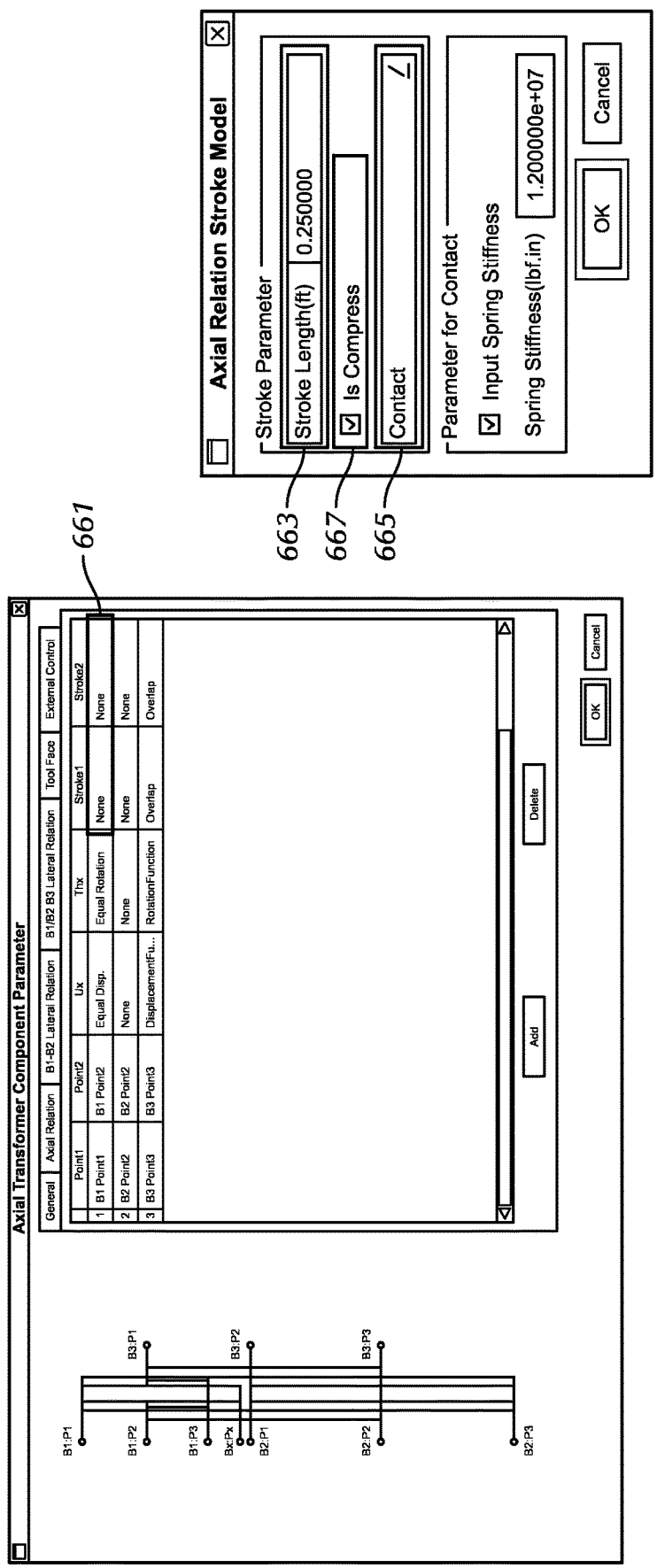

As shown in FIG. 9F, a number of stroke relationships may be defined in 661. The stroke length may be determined or calculated in 663, while the contact relationship may be determined at 665. Whether the stroke is a tension stroke or a compression stroke may be determined using 667.

Referring now to FIGS. 10A-10F, control relationships of a primitive in accordance with one or more embodiments is shown. In one or more embodiments, one or more of the elements shown in FIGS. 10A-10F may be omitted, repeated, and/or substituted. Accordingly, embodiments of the present disclosure should not be considered limited to the specific arrangements of elements shown in FIGS. 10A-10F.

Figure 10A:
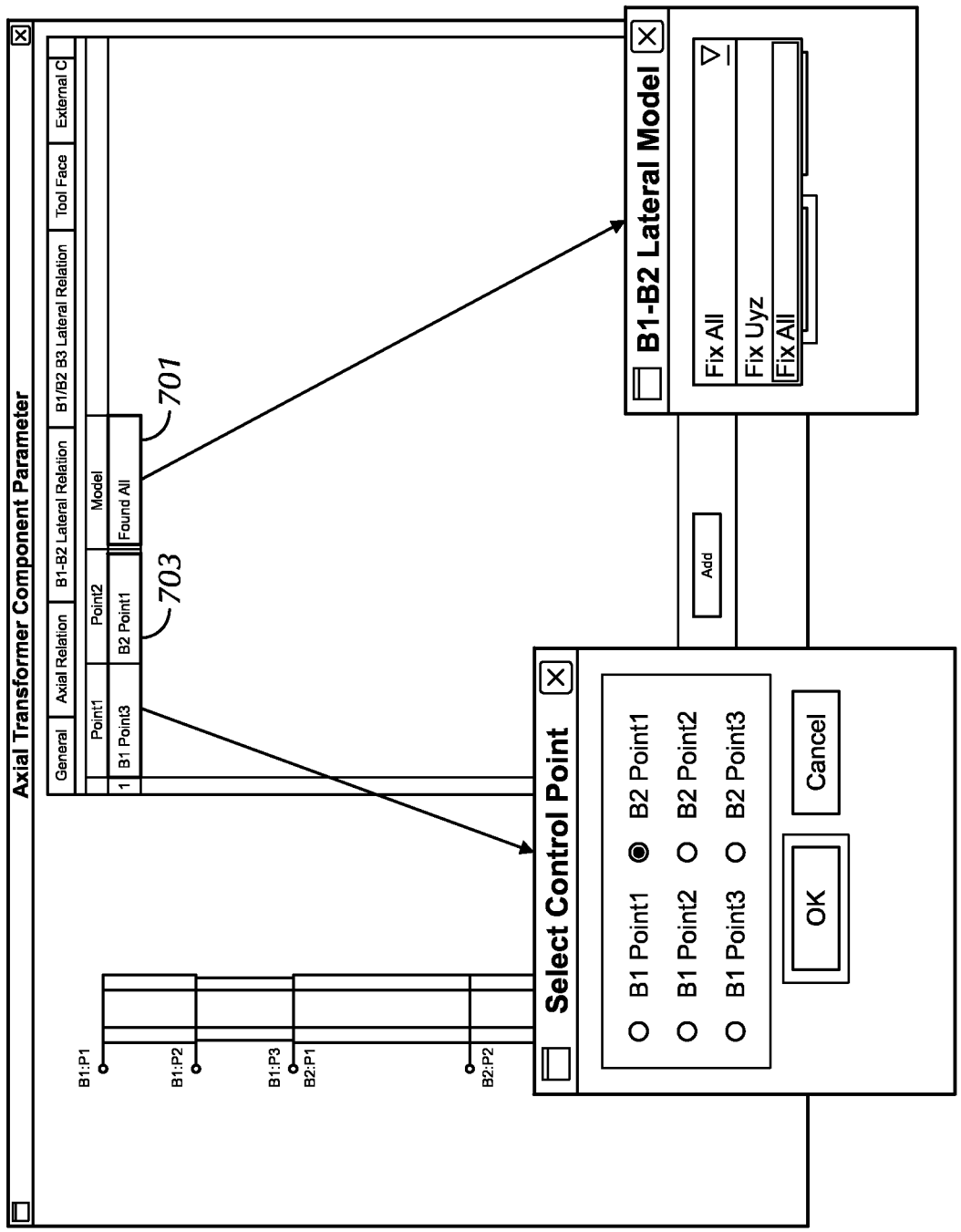

In FIG. 10A, a lateral relationship between two or more control points of primitive bodies is shown. In this example, two primitive bodies (i.e., sub-primitives) are shown, each having three control points. The control points may be selected in 703 and the control relationship between the control points may be selected in 701. The lateral relationships for two primitive bodies include one of two sets of fixed variables. One control relationship (Fix Uyz) fixes (sets) the lateral displacements of two control points to be the same. The other control relationship (Fix All) fixes (sets) the two control points to have the same displacements for six degrees of freedom.

Figure 10B:
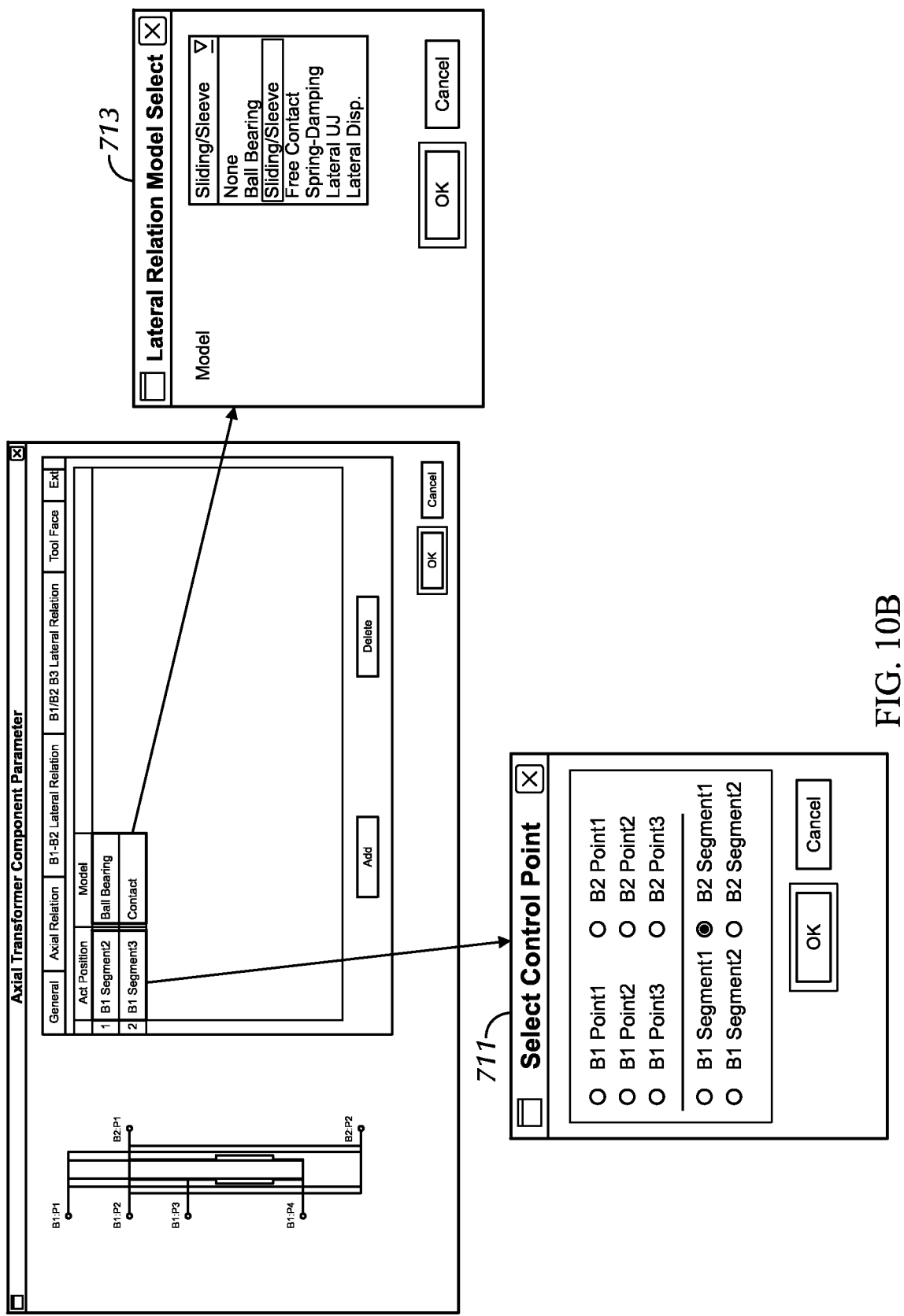

To ensure that primitive bodies B1 and B2 move in an axial direction with primitive body B3, additional lateral relationships may be determined for one or more control points of primitive bodies B1 and B2 with respect to primitive body B3. In FIG. 10B, a segment or a control point of at least one of primitive body B1 and primitive body B2 is selected at 711. The segment and/or control point may be selected with respect to primitive body B1 and/or primitive body B2. After selection, a point or a segment of primitive body B3 may also be selected. In some embodiments, based on the selected point or segment of one of primitive bodies B1 and B2, a point or a segment of primitive body B3 may be automatically defined or determined based on the position of the selected control point or segment. Thereafter, the control relationship between primitive body B3 and the selected control point and/or segment of one of primitive bodies B1 and B2 may be determined.

As shown in FIG. 10B, the control relationship may be selected in 713 and may include a ball bearing relationship in which primitive bodies B1 and B2 may move together with primitive body B3 along an axial direction, but may rotate independently of primitive body B3. The control relationship may include a sliding/sleeve relationship in which primitive bodies B1 and B2 move together with primitive body B3 both axially and rotationally. The control relationship may also be determined based on contact between primitive bodies B1 and B2 with primitive body B3, such as friction. Similar to the above, the control relationship may be determined by spring-dampening. A lateral U-joint relationship may be defined such that WOB and torque may be transferred between primitive body B3 and primitive bodies B1 and B2. Further, a lateral displacement relationship may be determined by the distance and angle between primitive body B3 and primitive bodies B1 and B2.

Referring to FIG. 10C, contact parameters for a contact relationship between primitive body B3 and primitive bodies B1 and B2 may be determined in 715. The coefficient of friction and the stiffness between the bodies may be determined at 717 and 719, respectively. In addition, a gap between the bodies may be selectable using 721 and may be determined at 723 based on a diameter of the primitive bodies. For example, the gap may be calculated based on the outer diameter of primitive B1 and the inner diameter of primitive B3.

As mentioned above, the control relationship may include a spring dampening relationship. Referring to FIG. 10D, parameters for the spring dampening relationship between bodies B1, B2, and B3 may be determined. The spring dampening relationship may include input parameters for a spring rate, damping coefficients, center position, and maximum and minimum forces.

Figure 10E:
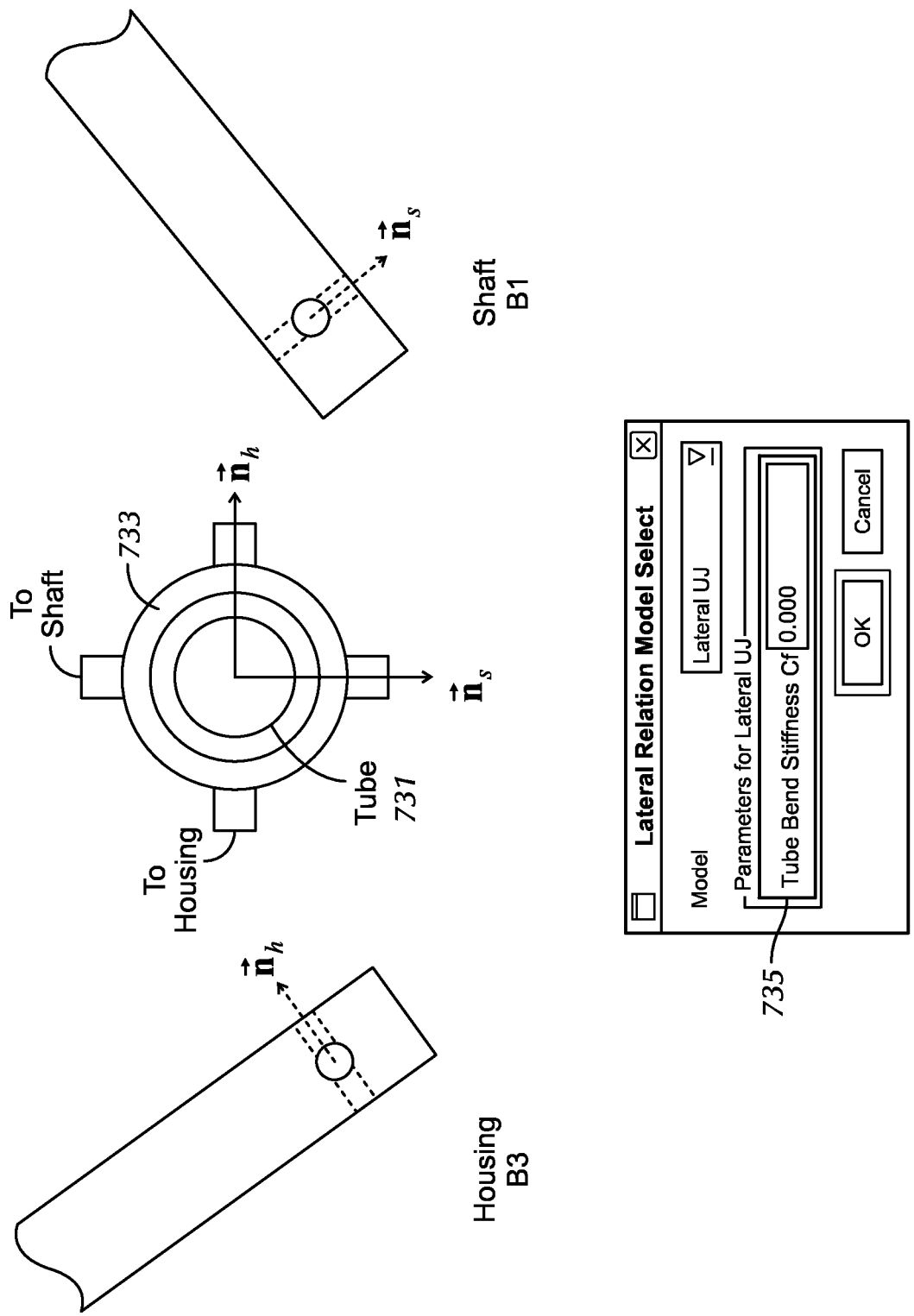

Referring now to FIG. 10E, a lateral u-joint relationship may be determined between at least one of primitive bodies B1 and B2 with respect to primitive body B3. As such, WOB and torque may be transferable between primitive body B3 and one of primitive bodies B1 and B2. The u-joint relationship includes a center tube 731 and a u-joint 733 capable of connecting to both primitive body B3 (housing) and primitive body B1 (shaft). The center tube bend stiffness may be determined at 735.

Figure 10F:
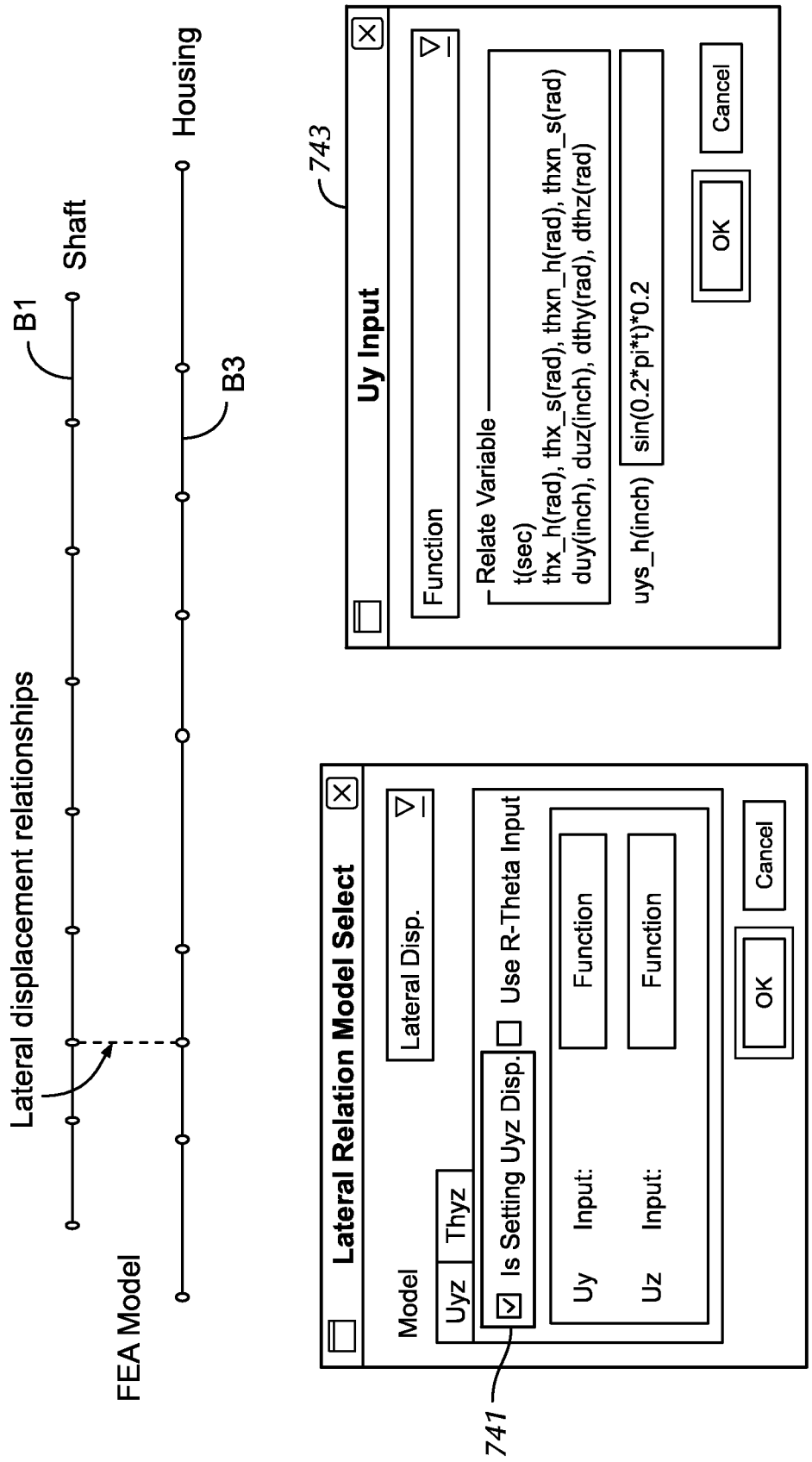

In one or more embodiments, a lateral displacement relationship may be determined between at least one of primitive bodies B1 and B2 with respect to primitive body B3. Referring to FIG. 10F, in this example, at certain positions along the length of the primitive, primitive body B1 may have a displacement relationship with primitive body B3. The lateral displacement relationship may be activated and/or deactivated at 741. When activated, the control relationship may be determined based on a function and/or one or more variables in 743. In addition, although shown with setting with respect to yz coordinates, the control relationship may also be defined with respect to r and θ. When using r and θ, an input function may be defined using an equation, a data list, or by external control, as discussed above.

Referring now to FIGS. 11A-11D, tool face control points in accordance with one or more embodiments is shown. In one or more embodiments, one or more of the elements shown in FIGS. 11A-11D may be omitted, repeated, and/or substituted. Accordingly, embodiments of the present disclosure should not be considered limited to the specific arrangements of elements shown in FIGS. 11A-11D.

In one or more embodiments, when designing a drilling system and/or a drilling component of a drilling system, pads or forces may be arranged circumferentially and/or may be applied radially about a control point on a primitive. For any control point, a user may determine or define the locations of one or more forces and one or more pads with respect to primitive body B3 or a well (e.g., a wall of a borehole).

Figure 11A:
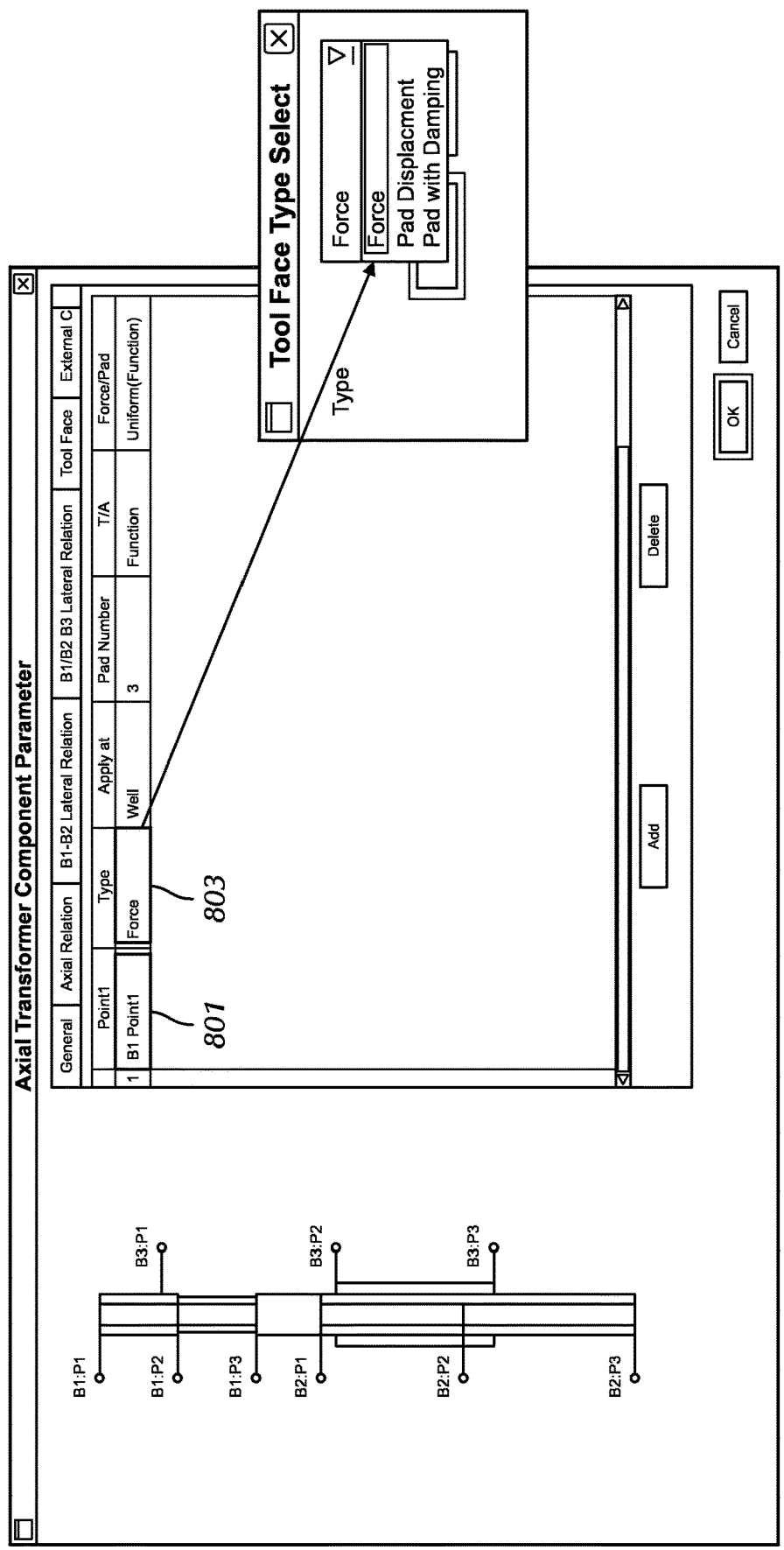

Referring to FIG. 11A, a control point may be selected in 801 and a type (force, pad displacement, and/or pad with damping) may be selected in 803. A force type may be used to define pressure force of a pad and in turn, a contact force may be determined based on the pressure force and force direction. A pad displacement type may be used to define a pad radial contact point with respect to a longitudinal axis of the primitive. A pad with damping type may be used to define a pad velocity and displacement calculated by pressure force and contact force.

Figure 11B:
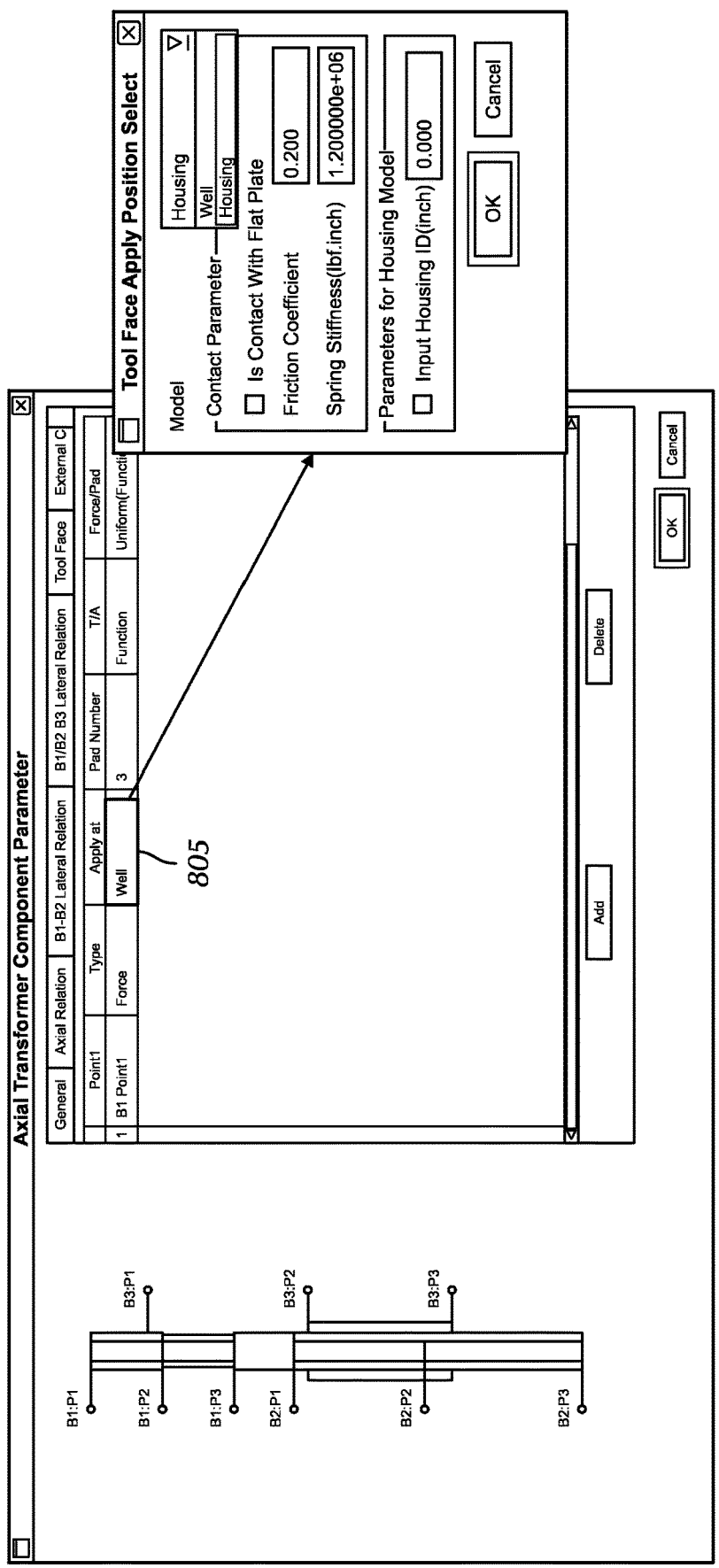

As shown in FIG. 11B, the type has been selected as a force in this example, and the force may be selected to be applied at or to a well or a housing (i.e., primitive body B3) in 805. Thus, a user may determine whether a pad or a force is applied at a particular position about a control point and may also determine the direction in which the force or pad is applied with respect to the longitudinal axis of the primitive.

Referring to FIG. 11C, as mentioned above, the force or pad may be applied at the well or at the primitive housing. If applied to a well, the minimum and maximum pad displacement may be determined at 811 and 813, respectively. If applied to the primitive housing, pad contact may be determined to contact a cylindrical or flat surface at 815. In addition, friction coefficient and contact stiffness may be determined at 817 and 819 respectively. Further, a primitive housing inner diameter may be input by activating at 821 and inputting at 823. In some embodiments, if the housing inner diameter is not activated, the inner diameter from primitive body B3, as previously determined, based on segment parameterization for example, may be used as the inner diameter.

Figure 11D:
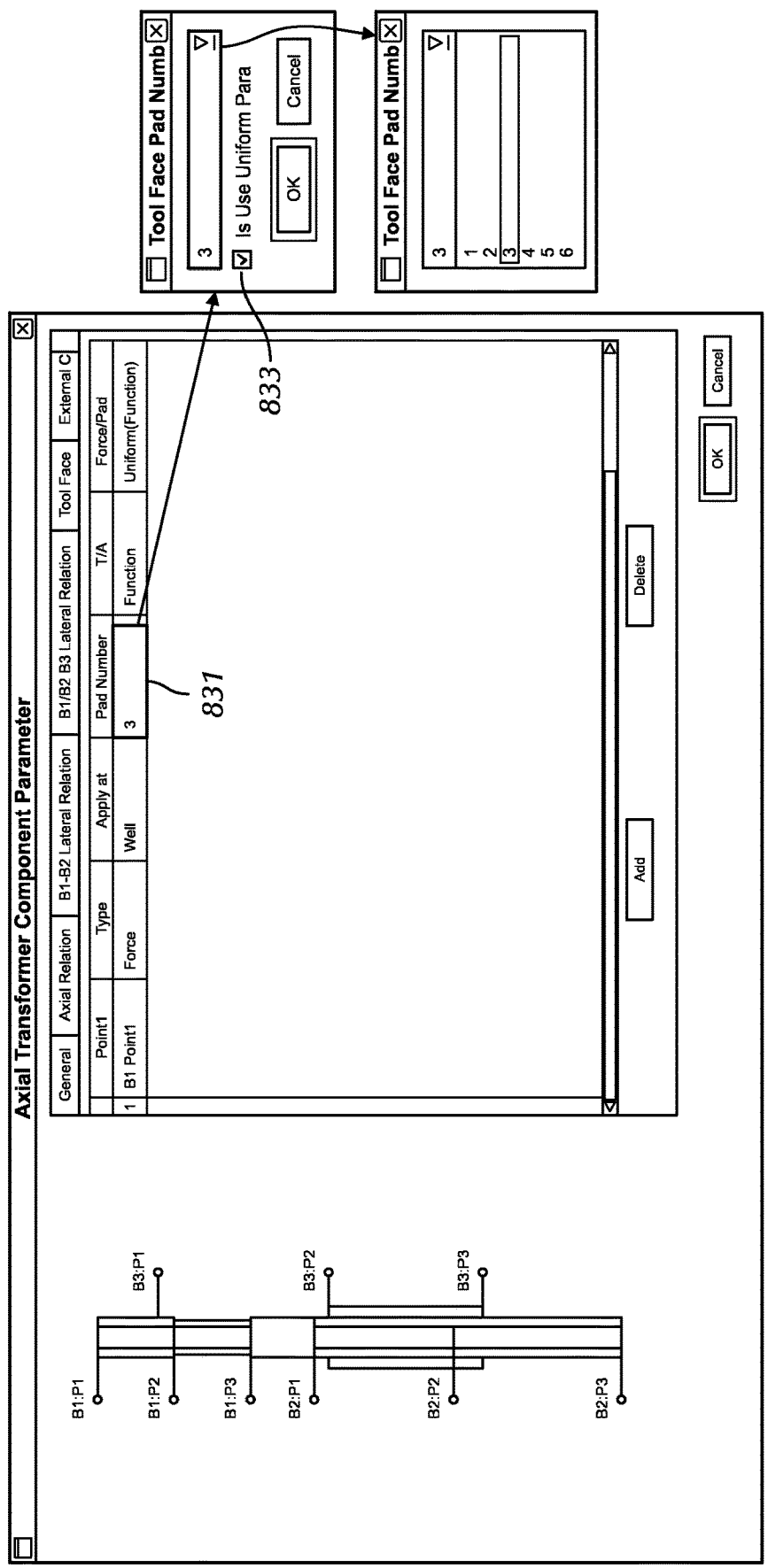

As shown in FIG. 11D, a number of pads may be input at 831. In this example, 3 pads are selected. If uniform para is selected at 833, the angle between pads will be substantially the same. If uniform para is not selected at 833, a user may input the position of each of the selected number of pads. In addition, pads may be offset using positive or negative offset values corresponding to clockwise and counterclockwise directions, respectively. Similar to the above, force, pad displacement, and pad with dampening may be based on a function or a number of variables that may be input manually, by using a data list, or by using external control.

According to embodiments of the present disclosure, control relationships may include but are not limited to axial relationships (i.e., relationships along a primitive longitudinal axis) defined between two control points; lateral relationships between two or more bodies of a primitive as well as lateral relationships of a combination of two bodies with respect to a third body; radial relationships and circumferential properties at a control point of a primitive body; and stroke relationships, where a stroke relationship may be one of a contact relationship (tension and/or compression), an impact relationship (if a compress relationship is determined), and an overlap relationship. The contact relationship (tension or compression) may be used to determine a force applied to the two control points as they come in close proximity to one another during a simulation. The impact relationship may be used to determine the force applied to one or both of the control points should the two control points contact one another. The overlap relationship may be used to determine the force applied to one or both of the control points should one control point surpass the other during a simulation. Another control relationship type may include, for example, a type or source of energy for actuation such as electromagnetic energy, pressurized fluid energy, or hydraulic energy, to name a few. Other control relationship types may be used for inputting parameters of one or more primitives, depending on, for example, the drilling component type or portion of the drilling system being modeled with a primitive.

Although a number of control points and control relationships are discussed herein, the discussed control points and control relationships are provided for purposes of showing examples. Any number of control points may be determined and/or defined and thus, any number of control relationships may also be determined and/or defined. Furthermore, it may be possible that two or more control points may not have any control relationship with each other and/or with other control points.

Referring to FIGS. 12A-12G, designing a drilling system and/or one or more drilling components of a drilling system based on simulation of one or more primitives of the drilling system components in accordance with embodiments of the present disclosure is shown. In one or more embodiments, one or more of the elements shown in FIGS. 12A-12G may be omitted, repeated, and/or substituted. Accordingly, embodiments of the present disclosure should not be considered limited to the specific arrangements of elements shown in FIGS. 12A-12G.

Figure 12A:
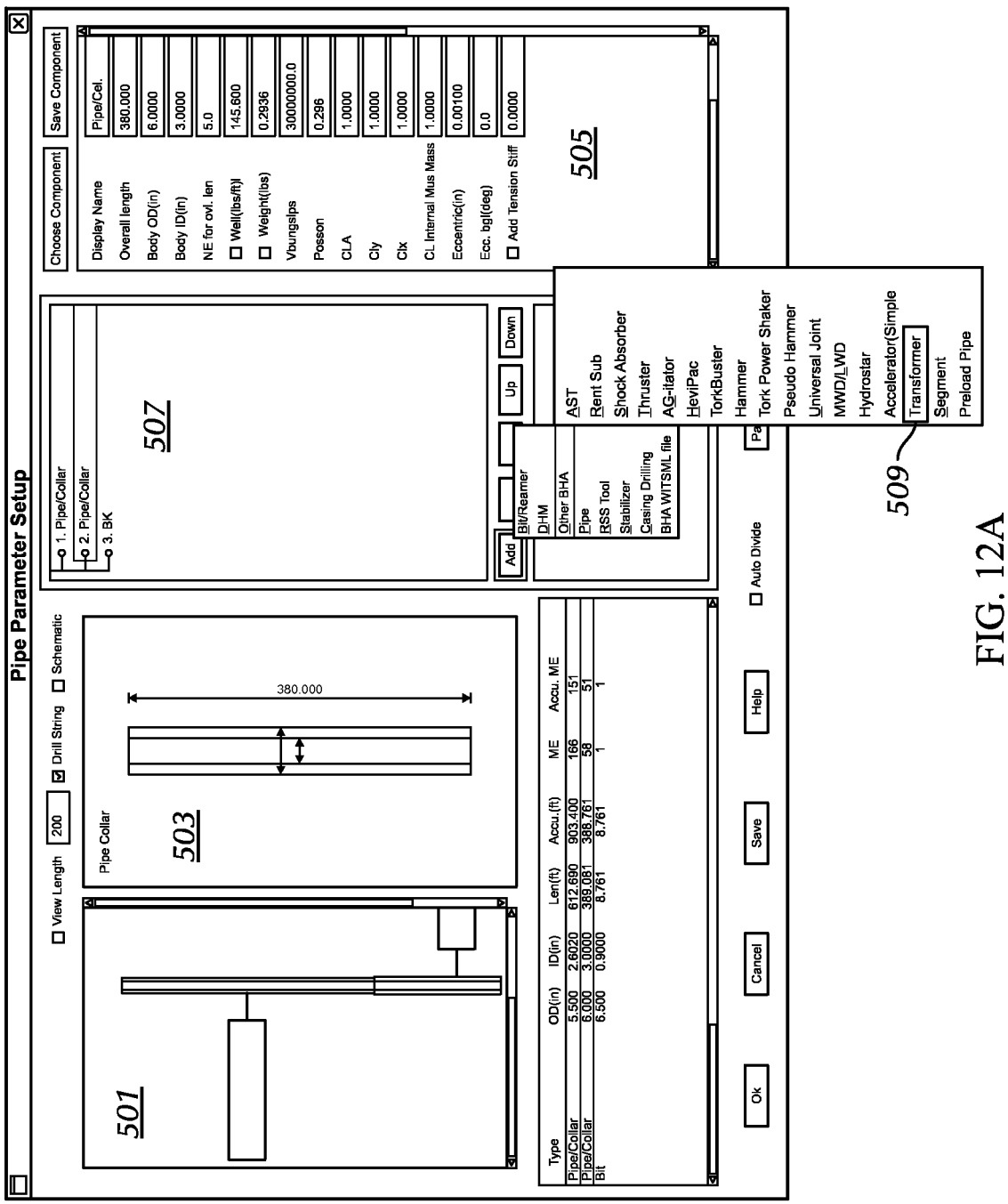
FIGS. 12A-12G depict examples of designing a drilling system and/or one or more primitives of a drilling system in accordance with one or more embodiments of the present disclosure.

In one or more embodiments, a drilling component for a drilling system may be designed using a primitive model. The primitive model may be generated by a user using a graphical user interface (GUI), for example. In FIG. 12A, a design view of a primitive model is shown. As depicted, a primitive model is visualized in 501, while a selected sub-primitive, segment, or sub-segment may be visualized in 503. A list of primitives, sub-primitive, segments, and sub-segments is shown in 507 and parameters or properties of the selected primitive, sub-primitive, segment, or sub-segment may be shown and/or modified in 505. To design a primitive, a user may select a primitive type at 509, from a drop-down menu, or by any other means known in the art, for example. Once selected, the primitive may be added to the primitive design and may be listed in 507 and customized in 505.

Figure 12B:
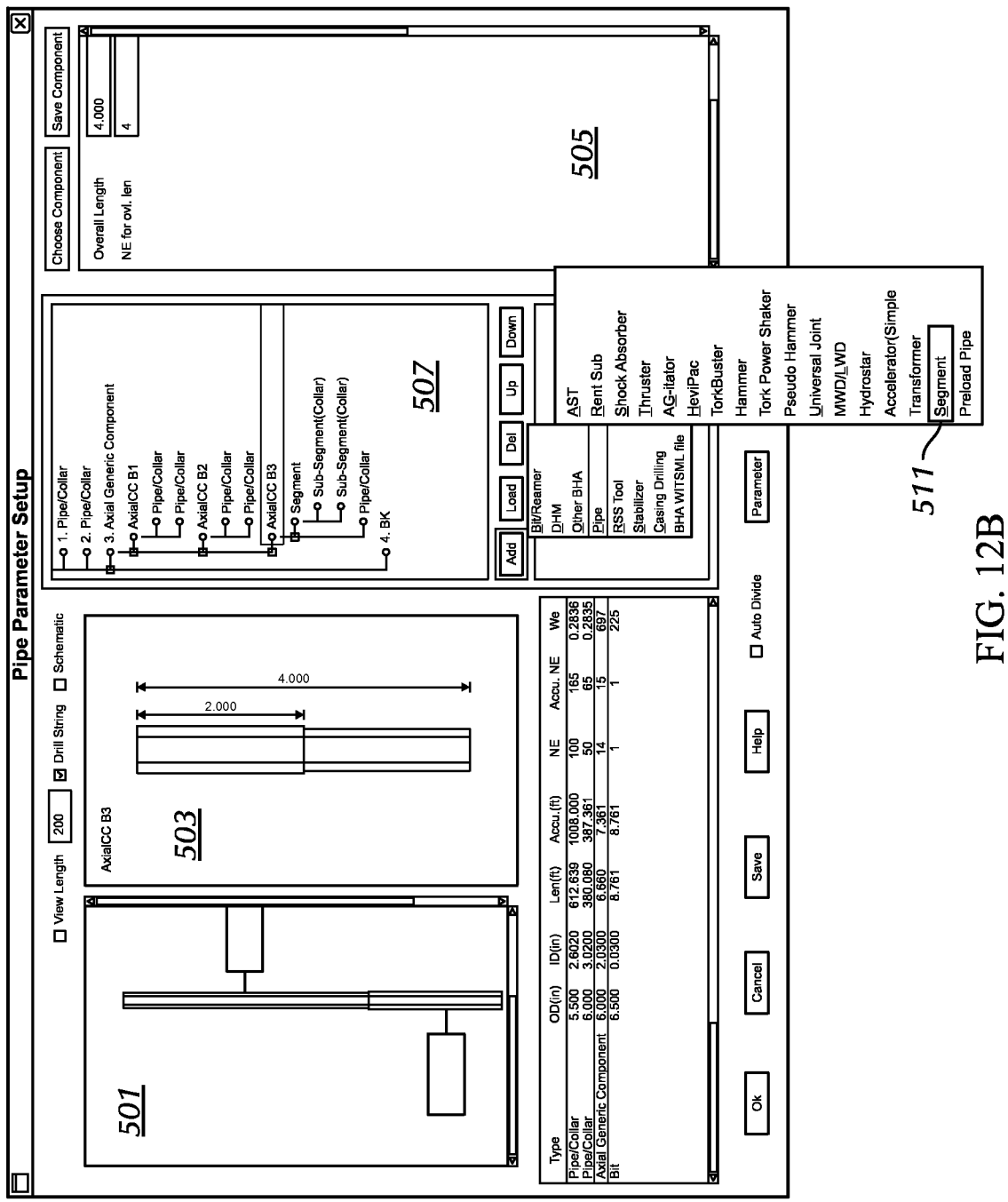
Figure 12C:
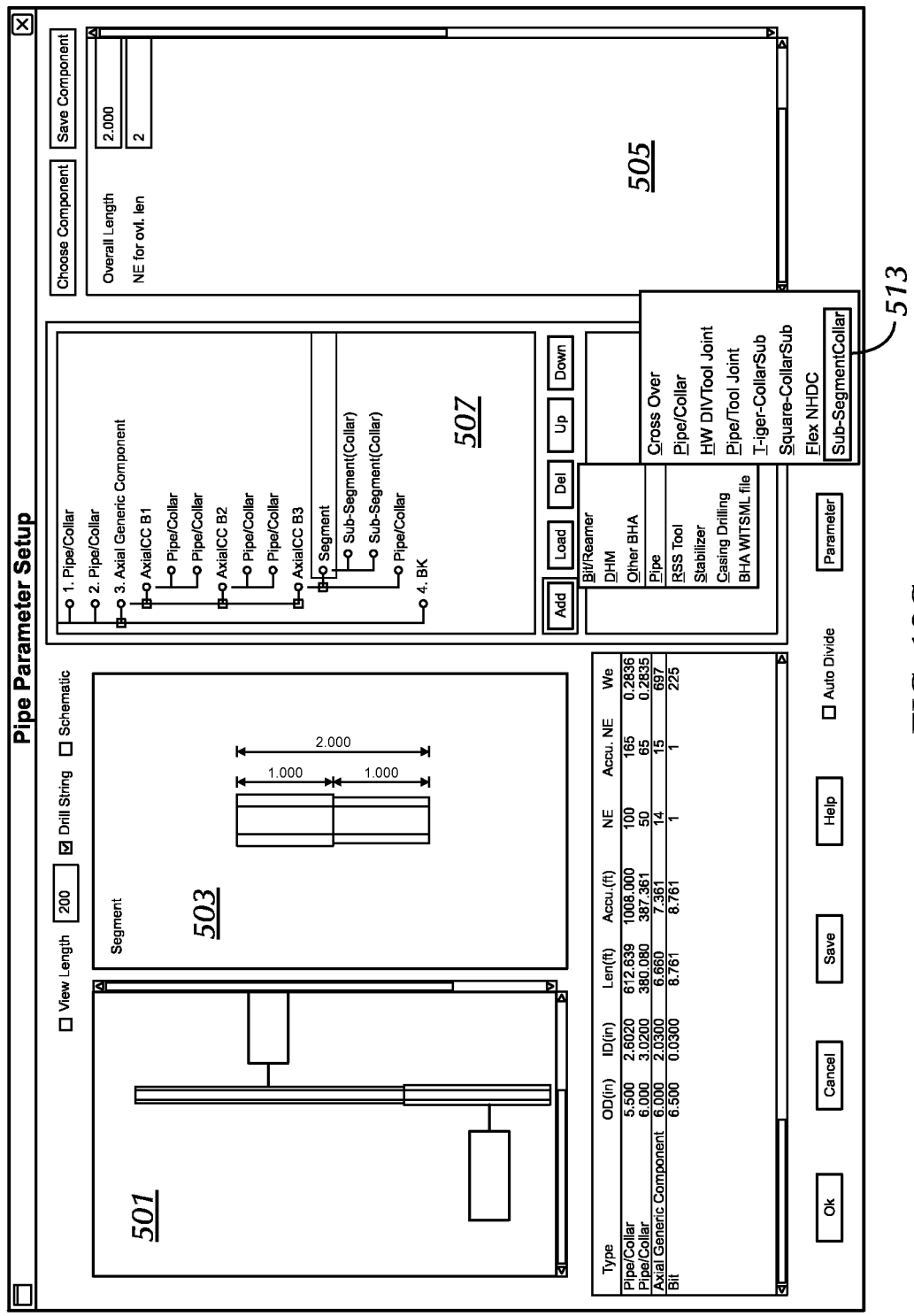
Figure 12D:
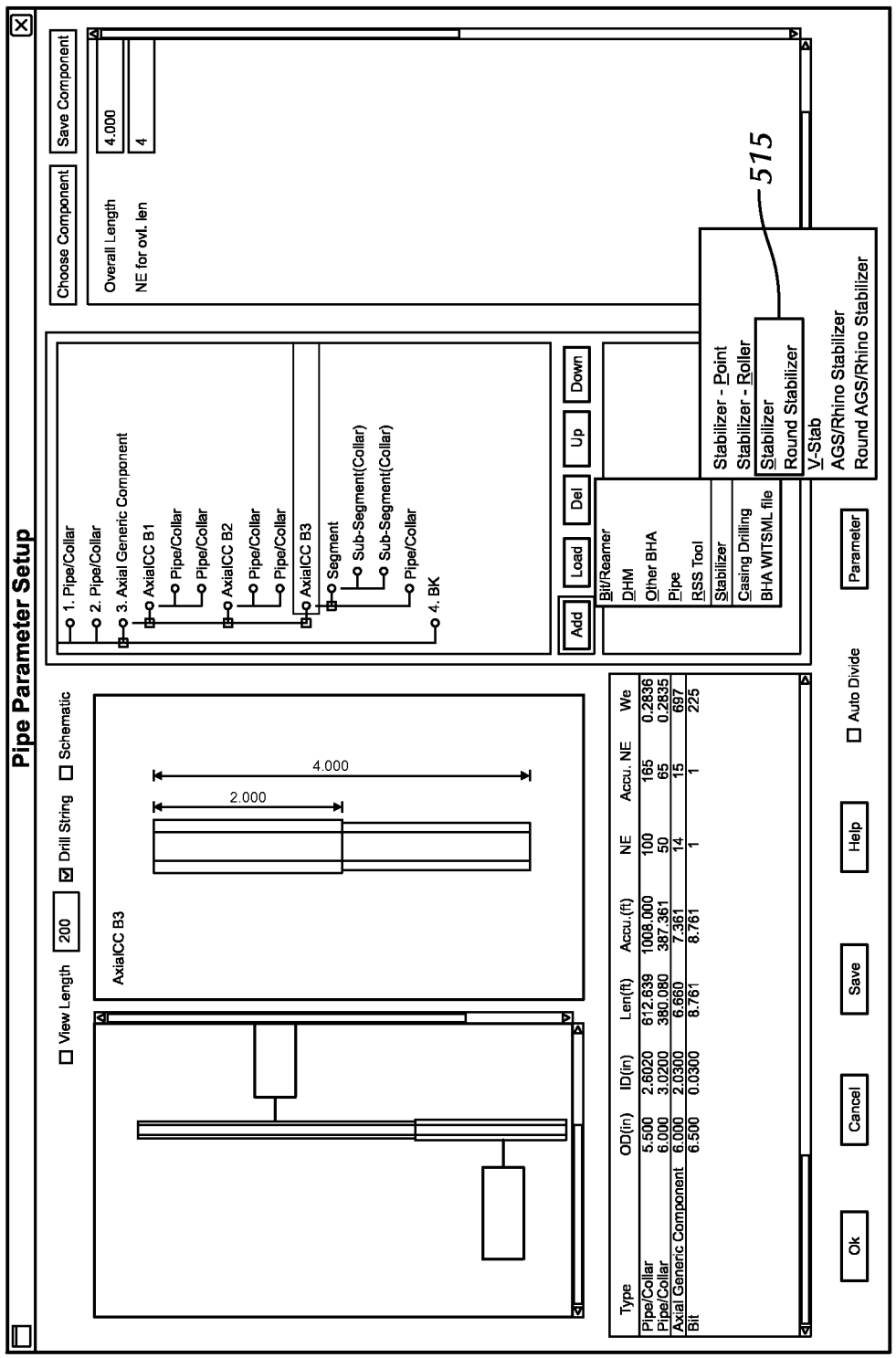

Similarly, in FIG. 12B, a user may select and/or add a segment from a drop-down menu, or by any other means known in the art, at 511. In addition, in FIG. 12C, a user may select and/or add a sub-segment, from a drop-down menu, or by any other means known in the art, at 513, while other components, such as a stabilizer, may also be added, as shown at 515 in FIG. 12D.

After adding a primitive, sub-primitive, segment, and/or sub-segment, the user may configure and/or customize the one or more segments and sub-segments. For example, a user may define or configure the length of a pipe to be a particular value, such as 1 meter, and the diameter of a pipe collar to be another value, such as 10 inches, for example. Properties that may be modified by a user include, for example, geometry, material properties, and coefficients for non-circular sections, among many others. As the properties of the segments and sub-segments are input/selected/defined by a user, the properties of the sub-primitive are defined. As the primitive design depends on the segments and sub-segments of the sub-primitive, the primitive design is defined by a user through the modifications of the primitive itself, as well as the sub-primitives, segments, and sub-segments.

Figures 12E, 12F:
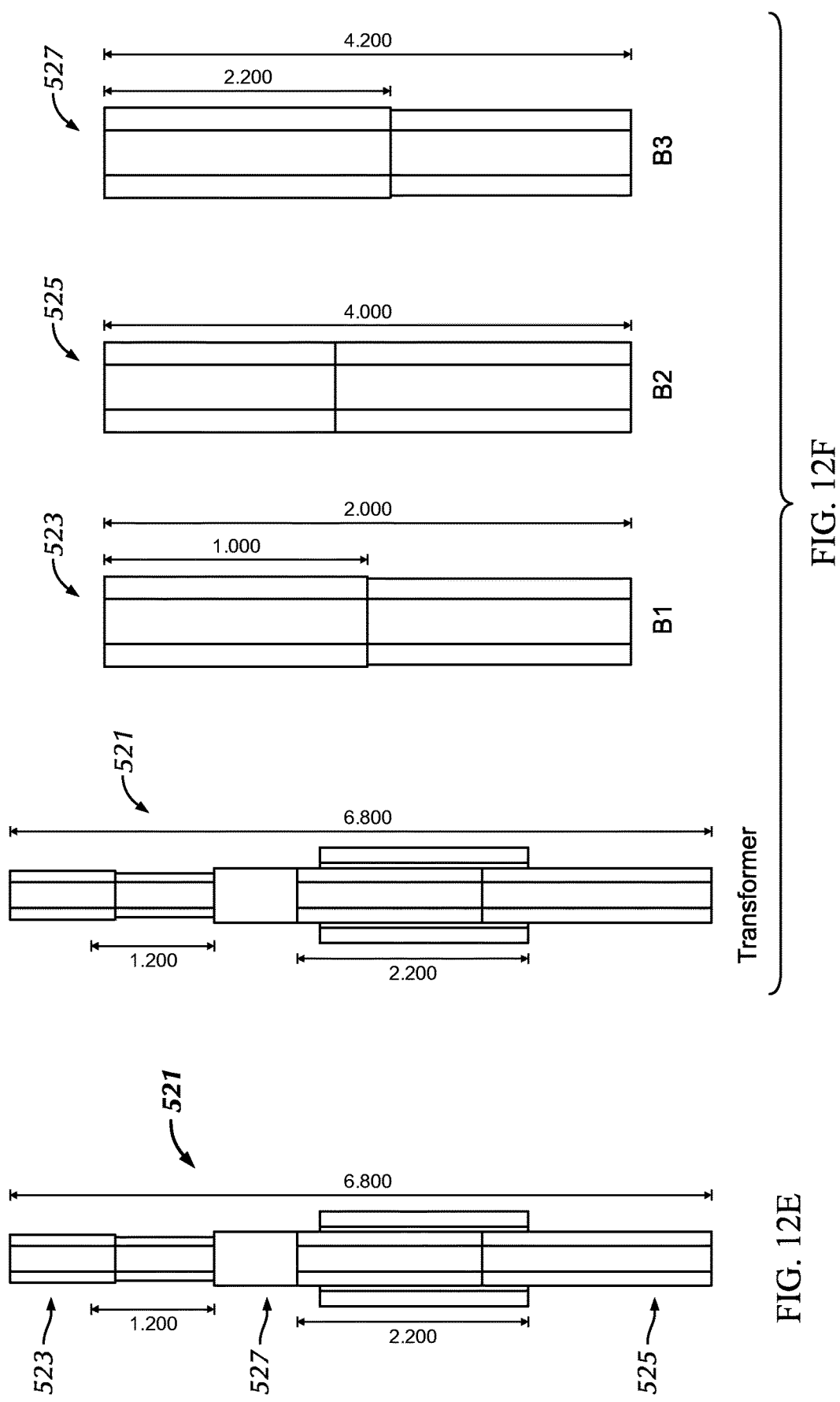

In one or more embodiments, a number of sub-primitives, segments, and sub-segments, and the primitive may be visualized. In FIG. 12E, a primitive 521 includes a first body 523, a second body 525, and a third body 527 (i.e., sub-primitives). Similarly, as shown in FIG. 12F, a visualization is shown of the primitive 521 and the corresponding first, second, and third bodies 523, 525, and 527 (B1, B2, and B3) of the primitive 521.

Figure 12G:
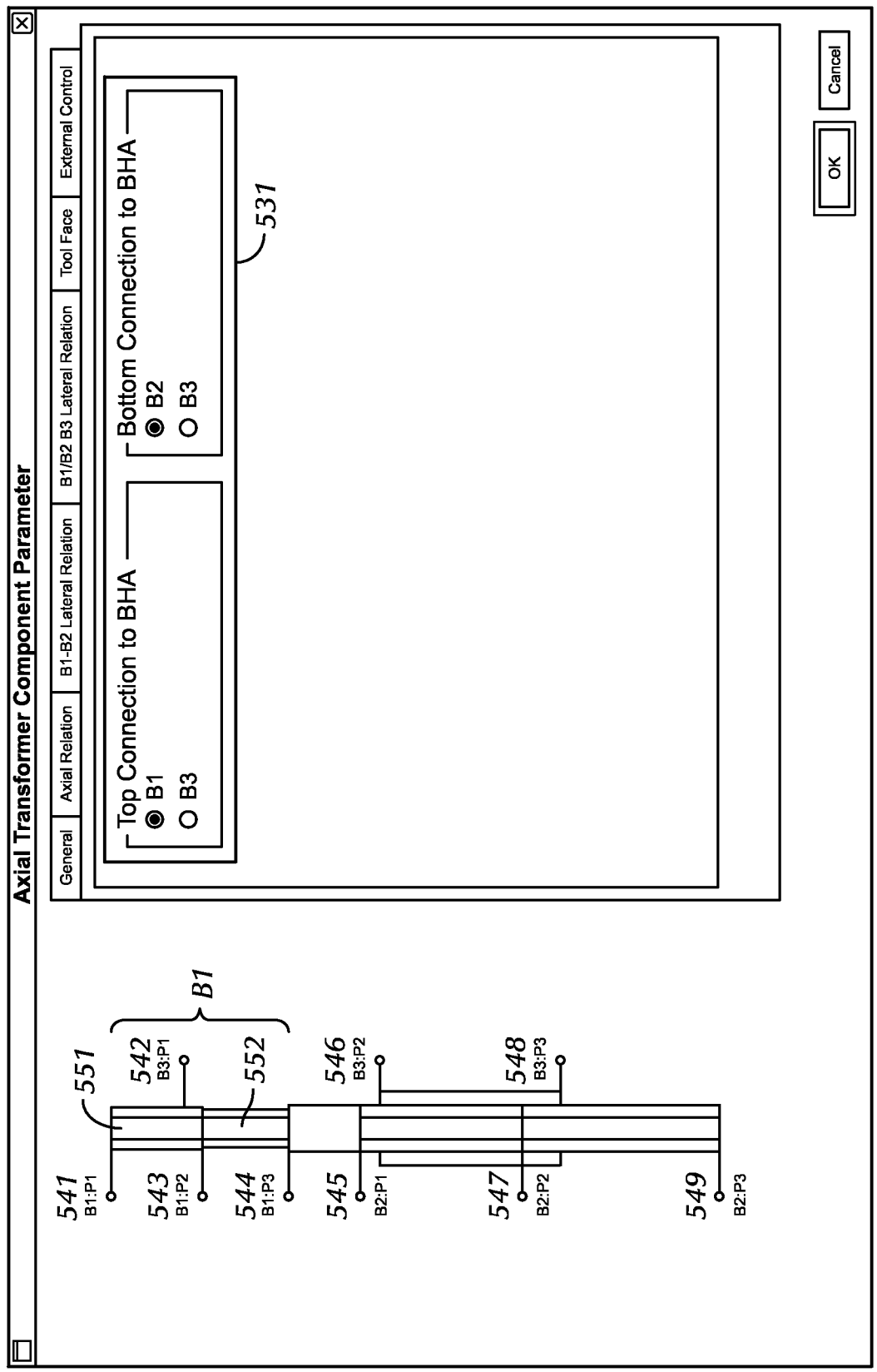

During customization, the user may select the connection of the primitive bodies with respect to a BHA, a drill bit, drill rig, and/or the drill string as shown in FIG. 12G at 531. The user may also customize the interaction of two or more bodies by defining relationships between the segments of the bodies. Accordingly, in one or more embodiments, the user may define and/or customize a number of control points. In FIG. 12G, control points 541, 542, 543, 544, 545, 546, 547, 548, and 549 are shown. In this embodiment, the control points 541, 542, 543, 544, 545, 546, 547, 548, and 549 are defined with respect to end points of each of the segments of sub-primitives. For example, body B1 includes two segments 551 and 552. Control point 541 is defined at a distal end of segment 551, while control point 544 is defined at a distal end of segment 552. As segments 551 and 552 meet at an end of each of segments 551 and 552, a third control point 543 is defined where the segments 551 and 552 meet. Similarly, other bodies and corresponding control points may be defined by end points of one or more segments. A simulation may be run having the customized control relationships to simulate the defined primitive(s).

Figure 13A:
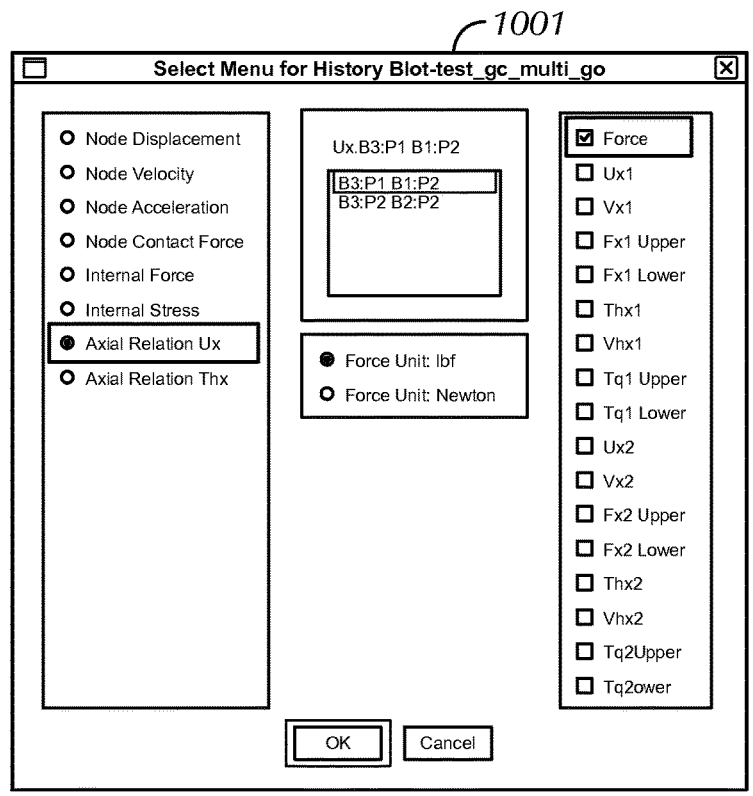
FIGS. 13A-13C depict examples of outputs in accordance with one or more embodiments of the present disclosure.
Figure 13A:
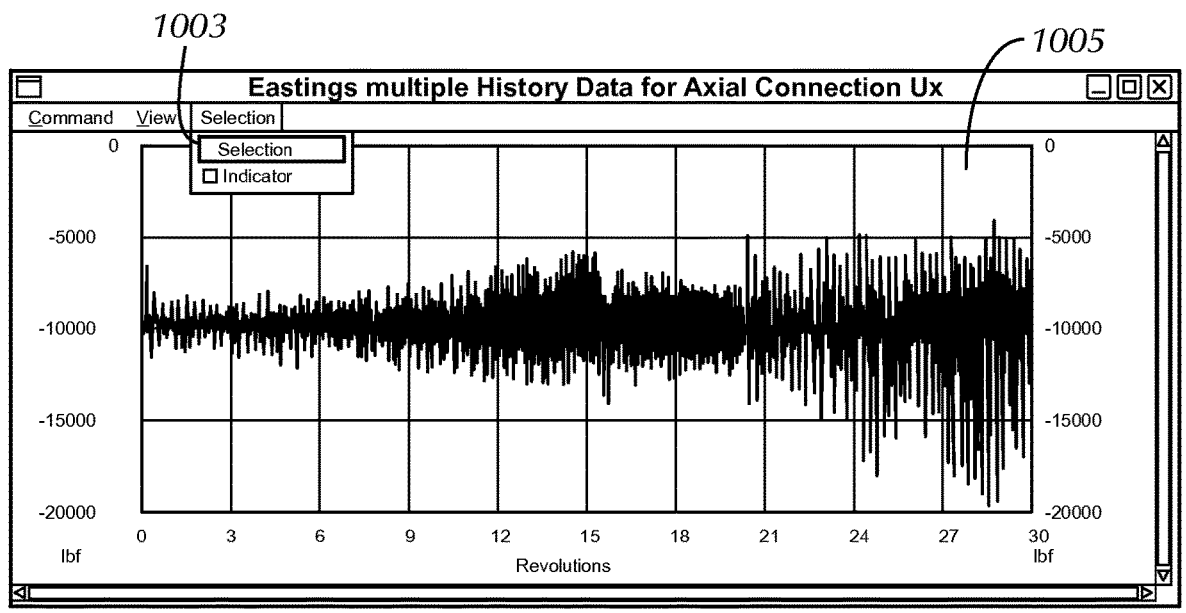
Figure 13B:
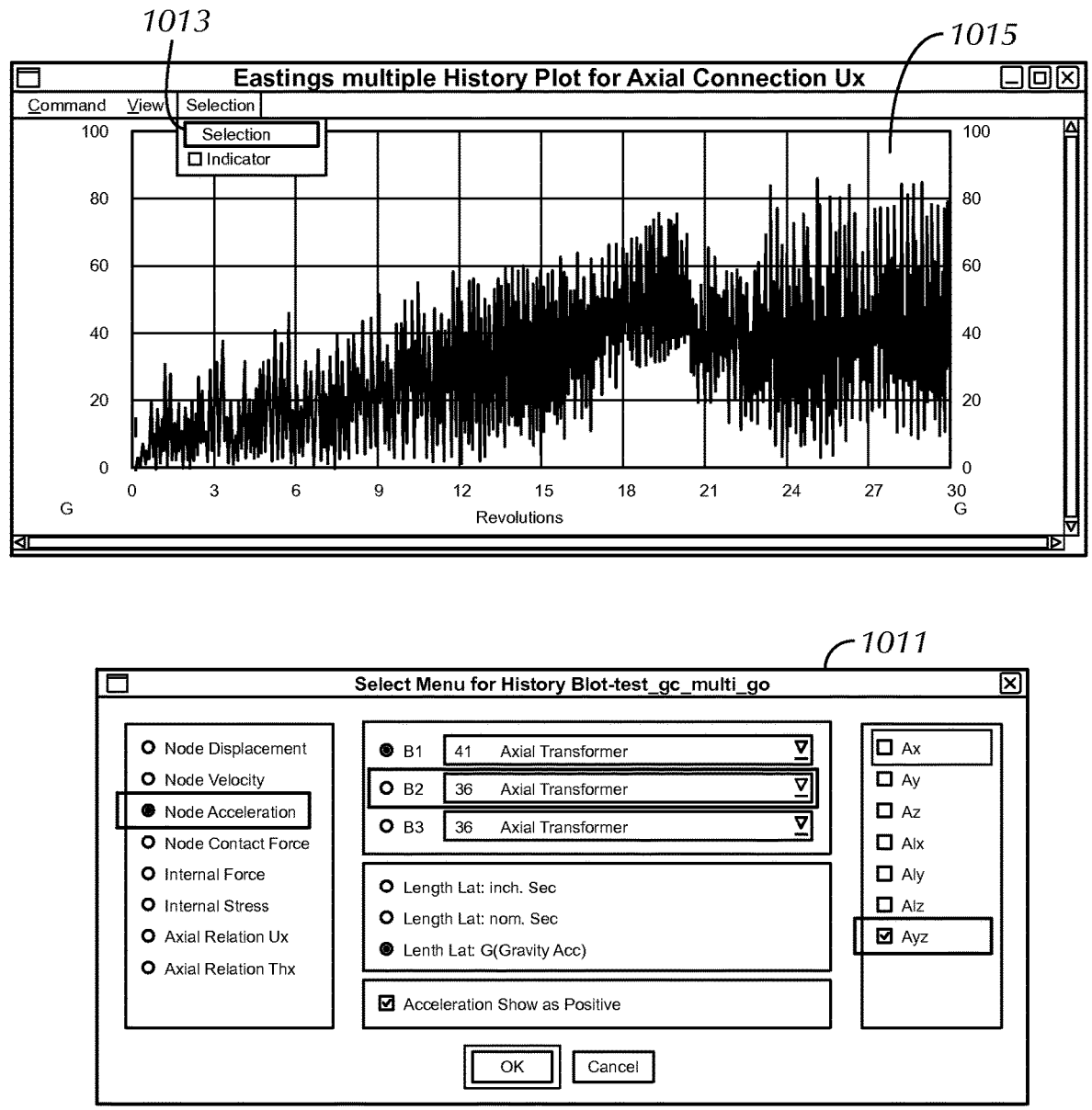
Figure 13C:
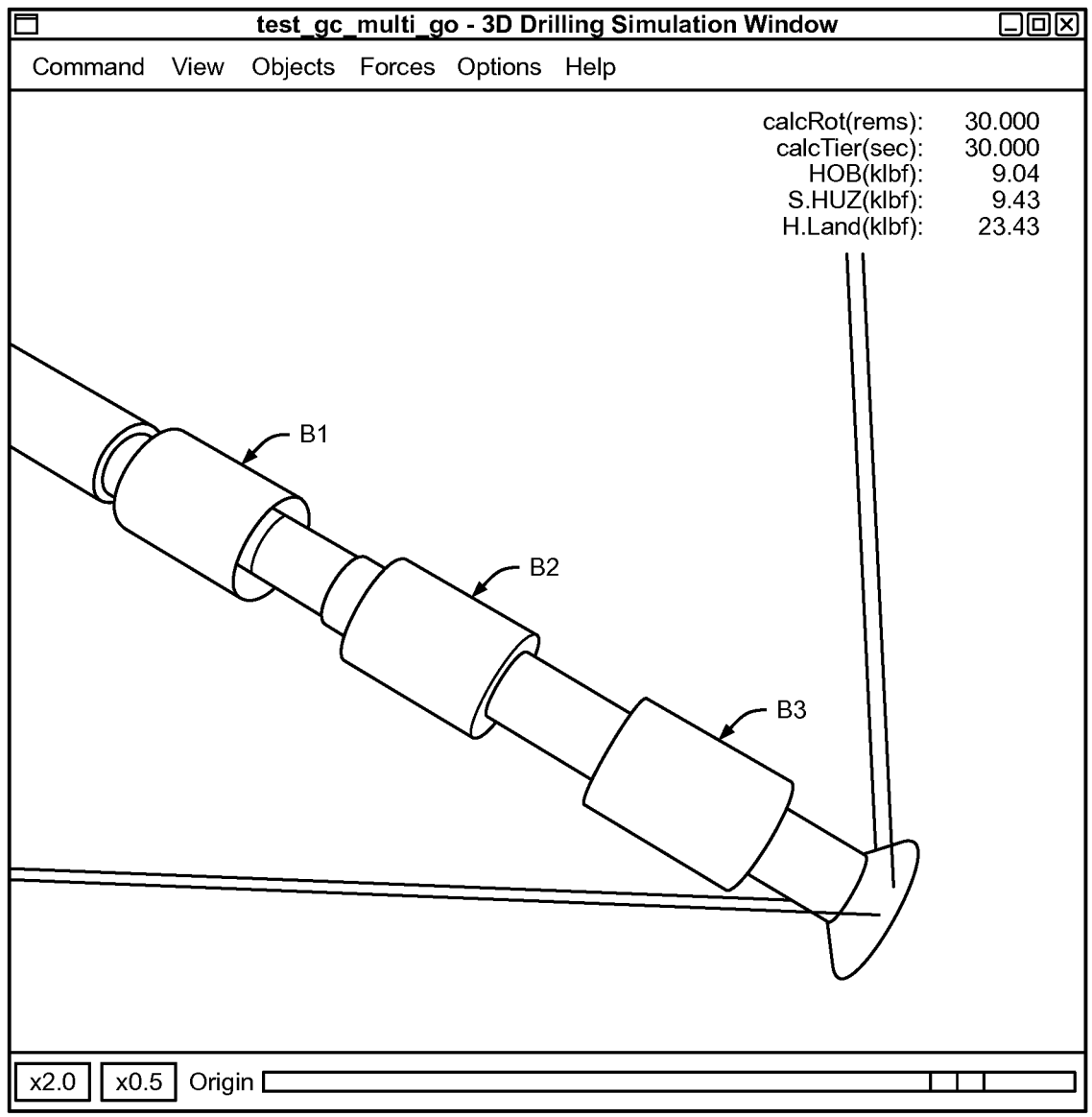

Referring now to FIGS. 13A-13C, examples of simulation outputs in accordance with one or more embodiments is shown. In one or more embodiments, one or more of the elements shown in FIGS. 13A-13C may be omitted, repeated, and/or substituted. Accordingly, embodiments of the present disclosure should not be considered limited to the specific arrangements of elements shown in FIGS. 13A-13C.

As shown in FIG. 13A, a history of two control points is shown. In FIG. 13A, the force axial relationship between two control points is selected in 1001 using menu option 1003. Plot 1005 is generated based on the selected relationship and control points. Here, the force between two control points is plotted in pound-force with respect to a number of revolutions performed during a simulation.

Similarly, in FIG. 13B, a history of two control points is shown. In FIG. 13B, a node acceleration of a primitive is selected in 1011 using menu option 1013. Plot 1015 is generated based on the selected relationship and control points. History plots may include a number of axial and/or lateral relationships for at least one control point or between two control points. Forces, accelerations, velocities, angles, torques, displacements, and any other simulation results as well as a corresponding coordinate system and/or direction may be plotted or calculated.

Referring to FIG. 13C, a visualization of a simulation in accordance with one or more embodiments is shown. In FIG. 13C, a 3D rendering of a primitive having primitive bodies B1, B2, and B3 is shown.

Figure 14A:
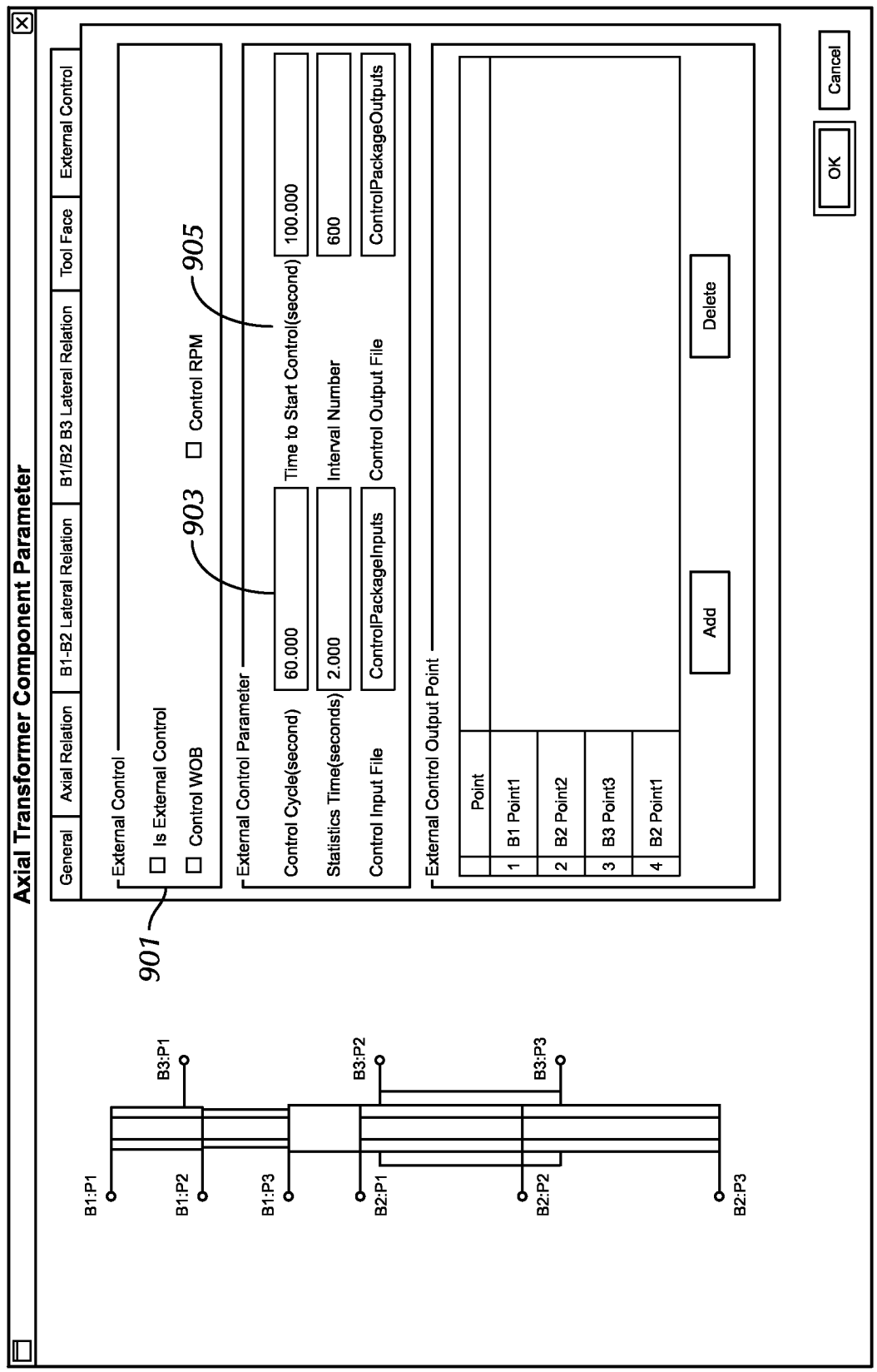

Referring now to FIGS. 14A-14B, designing a drilling component of a drill system in accordance with one or more embodiments is shown. In one or more embodiments, one or more of the elements shown in FIGS. 14A-14B may be omitted, repeated, and/or substituted. Accordingly, embodiments of the present disclosure should not be considered limited to the specific arrangements of elements shown in FIGS. 14A-14B.

In one or more embodiments, one or more inputs of a primitive model may be controlled by an external control. The external control may be a software program for example. As shown in FIG. 14A, external control may be selected at 901. The external control may control the inputs of the primitive based on a control cycle at 903 having a start time defined at 905. Thus, the external control may control a portion of the inputs for a portion of the time in which the primitive is simulated. Accordingly, upon selecting an external control, a user is not limited to use of the external control.

In FIG. 14B, further parameters of the external control may be determined. A user may select the external control to WOB during simulation at 911 and control the RPM at 913. In addition, the external control may be parameterized to record data statistics and/or results beginning at a start time defined at 915 at an interval at 917.

Although a few example embodiments have been described in detail above, those skilled in the art, having benefit of this disclosure, will readily appreciate that many modifications are possible in the example embodiments without materially departing from this disclosure. Accordingly, any such modifications are intended to be included within the scope of this disclosure as defined in the following claims.

In the claims, means-plus-function clauses are intended to cover the structures described herein as performing the recited function as well as equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. A method for designing a physical component of a drilling system, the method comprising:
defining, using a computer processor, input parameters of a first primitive in the drilling system, the input parameters comprising at least one control relationship between a first control point on the first primitive and a second control point on a second primitive,
wherein the control relationship includes both of status and dynamic relationships and define the degrees of freedom between the first control point on the first primitive and the second control point on the second primitive,
wherein each of the first primitive and the second primitive:
has a general shape of a drilling component for a drilling system;
is defined by the control relationships between elements of the general shape of the primitive and;
lacks a design specification, including at least a material selection for the primitive;
providing a drilling design tool to define the control relationships for the first primitive and the second primitive;
simulating, by the computer processor, the drilling system with the first primitive to obtain a performance parameter of the first primitive without simulating any design in any design specification, wherein simulating the drilling system is a transient time simulation comprising modeling performance of drilling operations of the first primitive based on at least one of time and incremental rotation of the drilling system;
wherein the first primitive and the second primitive are retrieved from a primitive library that stores a plurality of stored primitives,
designing, based on the performance parameter and after simulating the first primitive, the physical component for the drilling system to obtain a physical component design, the physical component having the input parameters of the first primitive and the design specification;
simulating the physical component of the drilling system using the physical component design; and
storing the physical component design.

2. The method of claim 1, further comprising:
building the physical component according to the physical component design.

3. The method of claim 1, further comprising:
selecting a performance criterion for the drilling system; and
altering at least one parameter to meet the performance criterion in the simulating, wherein the at least one parameter is selected from the group consisting of the input parameters of the first primitive and drilling system parameters.

4. The method of claim 1, further comprising:
defining input parameters of a second primitive, wherein the second control point is on the second primitive.

5. The method of claim 1, further comprising modifying at least one of the input parameters to optimize the performance parameter, wherein the physical component is designed to have the optimized performance parameters.

6. A method for designing a drilling system, the method comprising:
defining, using a computer processor, input parameters of a first primitive, the input parameters comprising at least one control relationship between a first control point on the first primitive and a second control point on a second primitive, wherein the control relationship includes both of status and dynamic relationships and define the degrees of freedom between the first control point on the first primitive and the second control point on the second primitive, wherein each of the first primitive and the second primitive:
has a general shape of a drilling component for a drilling system;
is defined by the control relationships between elements of the general shape of the first primitive,
lacks a design specification, including at least a material selection for the first primitive;
providing a drilling design tool to define the control relationships for the first primitive;
defining at least one drilling system parameter;
simulating, by the computer processor, the drilling system with the at least one primitive functioning in the drilling system without simulating any design in any design specification, wherein simulating the drilling system is transient time simulation comprising modeling performance of drilling operations of the first primitive based on at least one of time and incremental rotation of the drilling system;
wherein the first primitive is retrieved from a primitive library that stores a plurality of stored primitives,
determining, by the computer processor, a performance parameter of the at least one primitive from the simulating;
designing, based on the performance parameter and after simulating the at least one primitive, the physical component for the drilling system to obtain a physical component design, the physical component having the input parameters of the first primitive and the design specification;
simulating the physical component in the drilling system using the physical component design; and
storing the performance parameter.

7. The method of claim 6, further comprising:
building the drilling system based on the performance parameter.

8. The method of claim 6, further comprising optimizing the performance parameters, the optimizing comprising:
altering the arrangement of the at least one primitive within the drilling system.

9. The method of claim 6, further comprising optimizing the performance parameters, the optimizing comprising:
defining input parameters for a second primitive; and
simulating the second primitive functioning in the drilling system.

10. The method of claim 6, further comprising:
selecting a performance criterion for the drilling system; and
altering at least one parameter selected from the group consisting of the input parameters and the at least one drilling system parameter to meet the performance criteria in the simulating.

11. The method of claim 6, further comprising:
designing a physical component based on each of the at least one primitive, the physical component having the input parameters of the primitive on which the physical component design is based.

12. A system for designing a component of a drilling system, comprising:
a computer processor;
memory comprising instructions executing on the computer processor with functionality to perform:
receiving parameters selected from primitive parameters, BHA parameters, wellbore parameters, and drilling operating parameters;
defining at least one control relationship between defined control points, at least one first control point located on a first primitive and at least one second control point located on a second primitive,
wherein the control relationship includes both of status and dynamic relationships and define the degrees of freedom between the first control point on the first primitive and the second control point on the second primitive,
wherein each of the first primitive and the second primitive is:
for a drilling component,
has a general shape of the drilling component,
is defined by the control relationships between elements of the general shape of the primitive,
lacks a design specification, including at least a material selection for the primitive;
providing a drilling design tool to define the control relationships for the first primitive and the second primitive;
performing a first simulation of the drilling system with the at least one first primitive and the second primitive based on the submitted parameters without simulating any design in any design specification, wherein performing the first simulation of the drilling system is a transient time simulation comprising modeling performance of drilling operations of the first primitive and the second primitive based on at least one of time and incremental rotation of the drilling system;
receiving the design specification of a physical component after performing the first simulation;
simulating the physical component of the drilling system using the design specification; and
presenting, on a graphical user interface, a first performance parameter from the first simulation.

13. The system of claim 12, wherein the memory further comprises instructions for:
modifying, based on the first performance parameter, at least one of the submitted parameters, wherein modifying includes changing a value of at least one parameter to obtain a modified parameter; and
presenting, on the graphical user interface, a second performance parameter from a second simulation, the second simulation based on the modified parameter.

14. The system of claim 13, wherein the memory further comprises instructions for selecting the component for use in the drilling system based on the first and second performance parameters.

15. The system of claim 13, wherein modifying comprises altering an arrangement of the at least one primitive.

16. The system of claim 12, wherein the memory further comprises instructions for:
receiving the primitive parameters of the at least one primitive; and
modeling a physical component having the primitive parameters.

17. The system of claim 16, wherein the memory further comprises instructions for:
modifying the model of the physical component.

18. The system of claim 12, further comprising a data repository storing a plurality of stored parameters selected from at least one of real drilling systems and real drilling components, the received parameters including at least one of the stored parameters.

\* \* \* \* \*